US012651270B2

(12) United States Patent
Fujita et al.

(10) Patent No.: US 12,651,270 B2
(45) Date of Patent: Jun. 9, 2026

(54) CONTENT MANAGEMENT SYSTEM, CONTENT GENERATION APPARATUS, CONTENT MANAGEMENT METHOD, CONTROL METHOD FOR CONTENTS GENERATION APPARATUS, AND STORAGE MEDIUM STORING CONTENT MANAGEMENT PROGRAM

(71) Applicant: CANON KABUSHIKI KAISHA, Tokyo (JP)

(72) Inventors: Atsushi Fujita, Tokyo (JP); Daiyu Ueno, Kanagawa (JP); Minoru Sakaida, Kanagawa (JP); Naohiko Tsuchida, Tokyo (JP); Keiichiro Kubo, Saitama (JP); Keisuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 18/446,249

(22) Filed: Aug. 8, 2023

(65) Prior Publication Data

US 2024/0054507 A1 Feb. 15, 2024

(30) Foreign Application Priority Data

| Aug. 10, 2022 | (JP) | 2022-128180 |
| Nov. 24, 2022 | (JP) | 2022-187312 |
| Jul. 3, 2023 | (JP) | 2023-109521 |

(51) Int. Cl.
*G06Q 30/018* (2023.01)
*G06Q 10/40* (2026.01)

(52) U.S. Cl.
CPC ......... *G06Q 30/0185* (2013.01); *G06Q 10/40* (2026.01)

(58) Field of Classification Search
CPC .......................... G06Q 30/0185; G06Q 50/01
See application file for complete search history.

(56) References Cited

U.S. PATENT DOCUMENTS

| 2008/0278599 A1* | 11/2008 | Shiohara ............ H04N 1/00175 |
| | | 348/222.1 |
| 2019/0303951 A1* | 10/2019 | Bakalis .............. G06K 7/10722 |

(Continued)

FOREIGN PATENT DOCUMENTS

JP 2017204706 A 11/2017

OTHER PUBLICATIONS

Rajendra Acharya, Transmission and storage of medical images with patient information, 2003, p. 303-310 (Year: 2003).*

*Primary Examiner* — Ibrahim N El-Bathy
(74) *Attorney, Agent, or Firm* — Canon U.S.A., Inc. IP Division

(57) ABSTRACT

A content management system includes a memory device and at least one processor. The memory device stores a set of instructions. The at least one processor configured to execute the instructions to apply an edition process to a content in accordance with an instruction from an administrator of the content, generate a hash value of an edited content immediately after generating the edited content by the edition process, generate an identification number for identifying the edited content, register the hash value of the edited content and the identification number in a blockchain in association with each other, receive a content subjected to an authenticity determination and an identification number for identifying the content concerned, and determine the authenticity of the received content by comparing a hash value generated from the received content with the hash value registered in the blockchain and corresponding to the received identification number.

12 Claims, 15 Drawing Sheets

(56) References Cited

U.S. PATENT DOCUMENTS

| | | | |
|---|---|---|---|
| 2022/0075845 A1* | 3/2022 | Bowen | G06F 30/30 |
| 2022/0123939 A1* | 4/2022 | Guinard | H04L 9/3226 |

* cited by examiner

Figure 4:
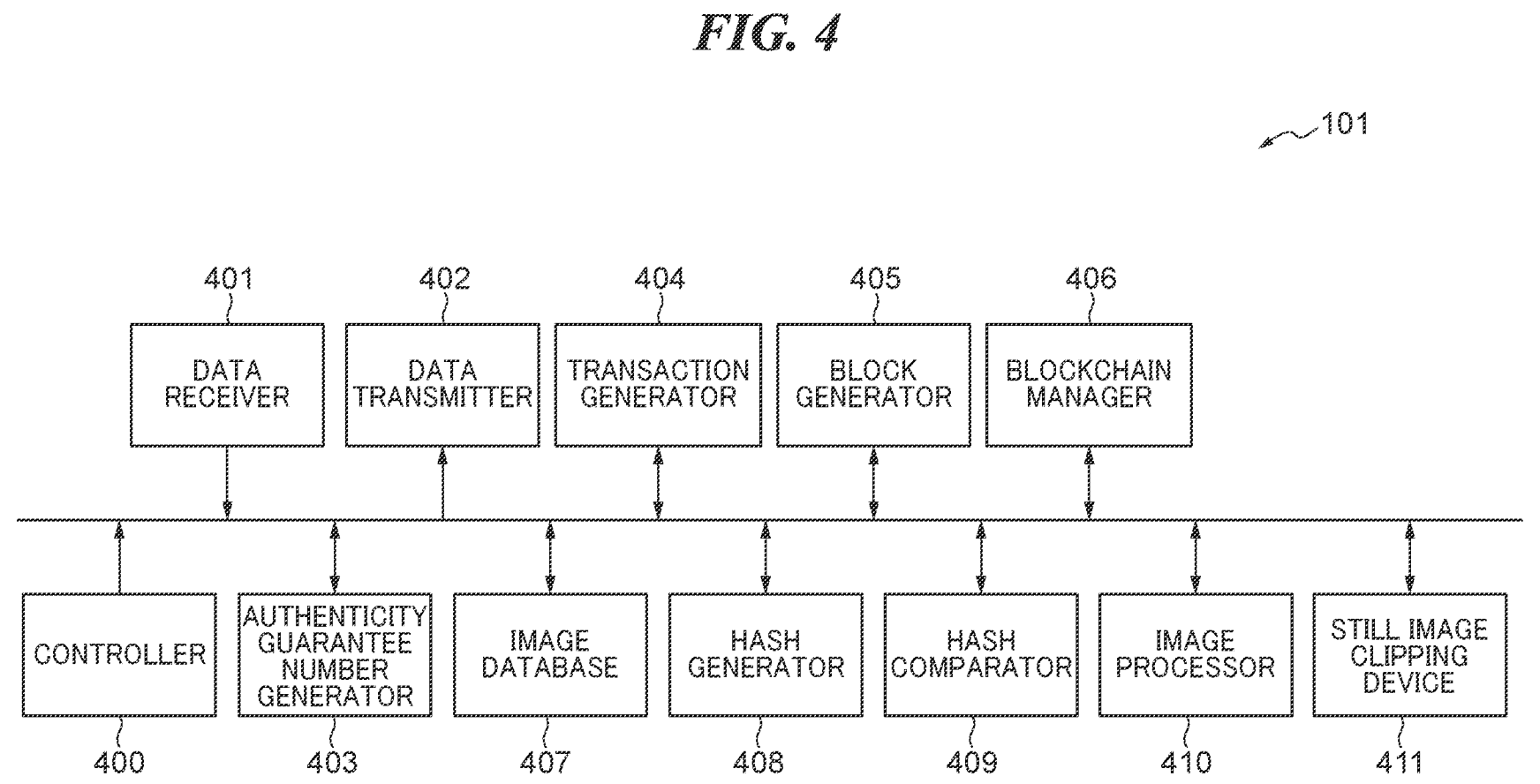

| 401 | 402 | 404 | 405 | 406 |
|---|---|---|---|---|
| DATA RECEIVER | DATA TRANSMITTER | TRANSACTION GENERATOR | BLOCK GENERATOR | BLOCKCHAIN MANAGER |

| 400 | 403 | 407 | 408 | 409 | 410 | 411 |
|---|---|---|---|---|---|---|
| CONTROLLER | AUTHENTICITY GUARANTEE NUMBER GENERATOR | IMAGE DATABASE | HASH GENERATOR | HASH COMPARATOR | IMAGE PROCESSOR | STILL IMAGE CLIPPING DEVICE |

*FIG. 5*

| BLOCK ID | AUTHENTICITY GUARANTEE NUMBER | IMAGE FILE NAME |
|----------|-------------------------------|-----------------|
| 0 | 0000000000000000 | MOV_0000.MP4 |
| 1 | 5432456667777773 | MOV_0001.MP4 |
| 2 | 0988501939374728 | IMG_0002.JPG |
| 3 | 1111220034355050 | MOV_0003.MP4 |
| 4 | 3322434456777888 | IMG_0004.JPG |

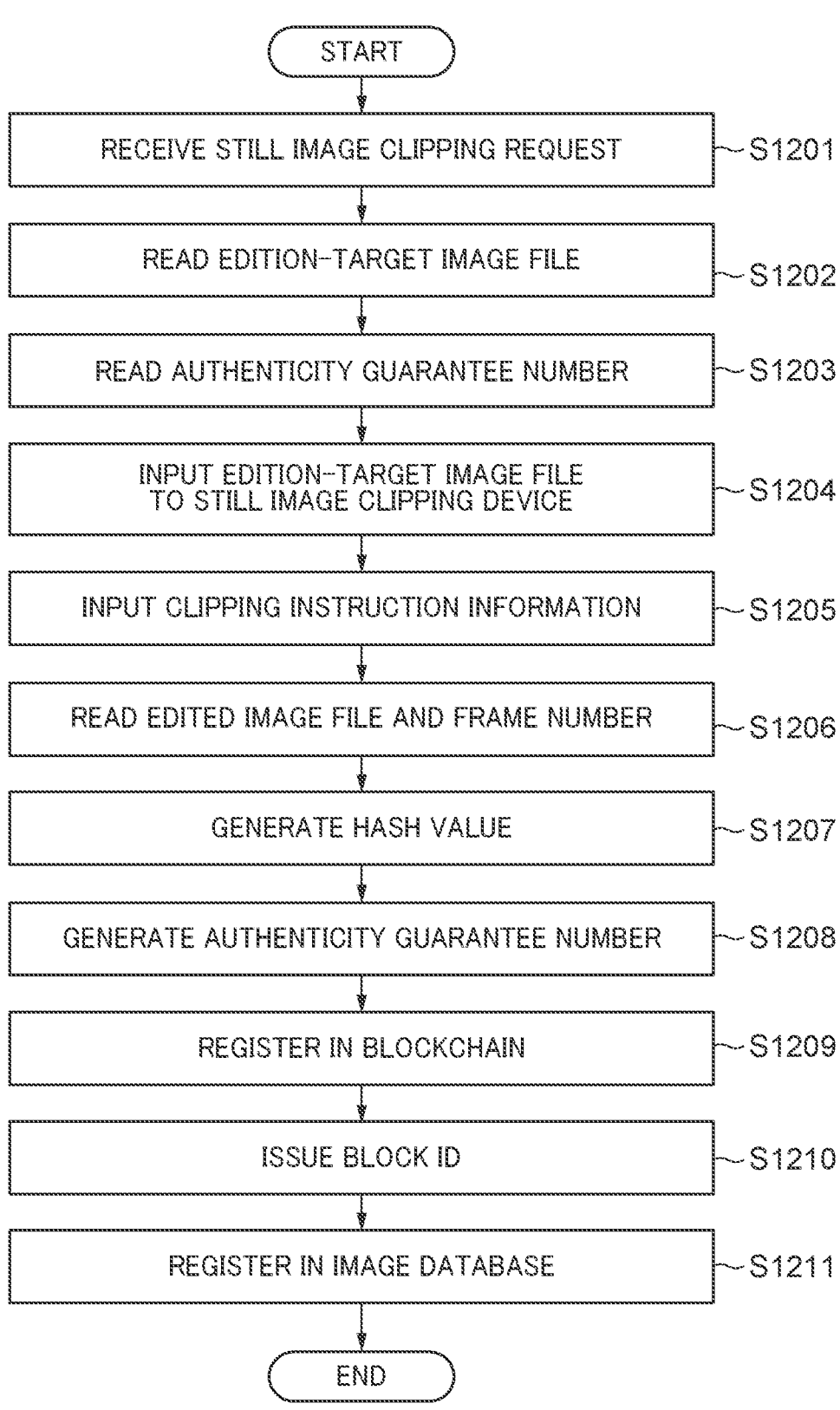

START

RECEIVE STILL IMAGE CLIPPING REQUEST — S1201

READ EDITION-TARGET IMAGE FILE — S1202

READ AUTHENTICITY GUARANTEE NUMBER — S1203

INPUT EDITION-TARGET IMAGE FILE TO STILL IMAGE CLIPPING DEVICE — S1204

INPUT CLIPPING INSTRUCTION INFORMATION — S1205

READ EDITED IMAGE FILE AND FRAME NUMBER — S1206

GENERATE HASH VALUE — S1207

GENERATE AUTHENTICITY GUARANTEE NUMBER — S1208

REGISTER IN BLOCKCHAIN — S1209

ISSUE BLOCK ID — S1210

REGISTER IN IMAGE DATABASE — S1211

END

1401

CONTENT MANAGEMENT SYSTEM, CONTENT GENERATION APPARATUS, CONTENT MANAGEMENT METHOD, CONTROL METHOD FOR CONTENTS GENERATION APPARATUS, AND STORAGE MEDIUM STORING CONTENT MANAGEMENT PROGRAM

BACKGROUND

Field of the Disclosure

The present disclosure relates to a content management system, a content generation apparatus, a content management method, a control method for the content generation apparatus, and a storage medium storing a content management program.

Description of the Related Art

In recent years, information sharing via the Internet and an SNS (Social Networking Service) has become prevalent, and everyone can view and send information. For example, still image data or moving image data captured by a digital camera or a smartphone can be posted to an SNS or the like. Moving image data includes a plurality of continuous frames, and a part of the frames can be clipped out as still image data, which is widely used by users. Since digital image processing techniques have further advanced under such circumstances, it has become difficult for a viewer of information to confirm authenticity of a viewed content, and problems such as fake news have become serious. In order to cope with such a problem, there is an increasing demand for a mechanism for guaranteeing the authenticity of a digital image (that the digital image has not been tampered with).

As a mechanism for guaranteeing authenticity of a digital image, use of a blockchain technology, which is widely used in industries including finance, is considered. The blockchain technology is a decentralized method and can prevent tampering of digital data at low cost. For example, a management system using the blockchain technology registers a hash value of a content calculated immediately after generating a content and metadata accompanying the content in a blockchain, and guarantees authenticity of the content from the time of generation (for example, see Japanese Patent Laid-Open Publication No. 2017-204706 (JP2017-204706A). This enables to obtain a content that has not been tampered with from the time of generation from the management system and to publish the obtained content on the Internet, SNS, etc.

There is also a need for a mechanism that guarantees authenticity of an edited content generated by a legitimate edition process in accordance with an instruction from a content provider. Examples of the legitimate edition processes include a development process for converting RAW data into image data in a data format designated by a user, a trimming process and an adjustment process applied to developed image data, and a process for clipping a part of frames from moving image data as still image data. The legitimate edition process is, for example, a process of generating one piece of synthetic image data, such as panoramic image data, from a plurality of pieces of image data obtained by capturing. However, the technique disclosed in JP2017-204706 cannot determine the authenticity of the content edited after the time of generation.

SUMMARY

Embodiments of the present disclosure provide a content management system, a content generation apparatus, a content management method, a control method for the content generation apparatus, and a storage medium storing a content management program, which are capable of determining authenticity of a content edited since its generation.

According to an aspect of the present disclosure, a content management system includes a memory device and at least one processor. The memory device stores a set of instructions. The at least one processor configured to execute the set of instructions to apply an edition process to a content in accordance with an instruction from an administrator of the content, generate a hash value of an edited content immediately after generating the edited content by the edition process, generate an identification number for identifying the edited content, register the hash value of the edited content and the identification number in a blockchain in association with each other, receive a content subjected to an authenticity determination and an identification number for identifying the content concerned, and determine the authenticity of the received content by comparing a hash value generated from the received content with the hash value registered in the blockchain and corresponding to the received identification number.

Further features will become apparent from the following description of exemplary embodiments with reference to the attached drawings.

BRIEF DESCRIPTION OF THE DRAWINGS

FIG. 2 is a block diagram schematically showing a configuration of an image capturing apparatus in FIG. 1.

FIG. 4 is a block diagram schematically showing a configuration of the content management system in FIG. 1.

FIG. 5 is a view showing an example of a configuration of an image database in FIG. 4.

FIG. 8 is a flowchart showing a procedure of an image data transmission process performed by the content management system in FIG. 1.

FIG. 12 is a flowchart showing a procedure of an image file edition process performed by the content management system in FIG. 1.

DESCRIPTION OF THE EMBODIMENTS

Figure 1:
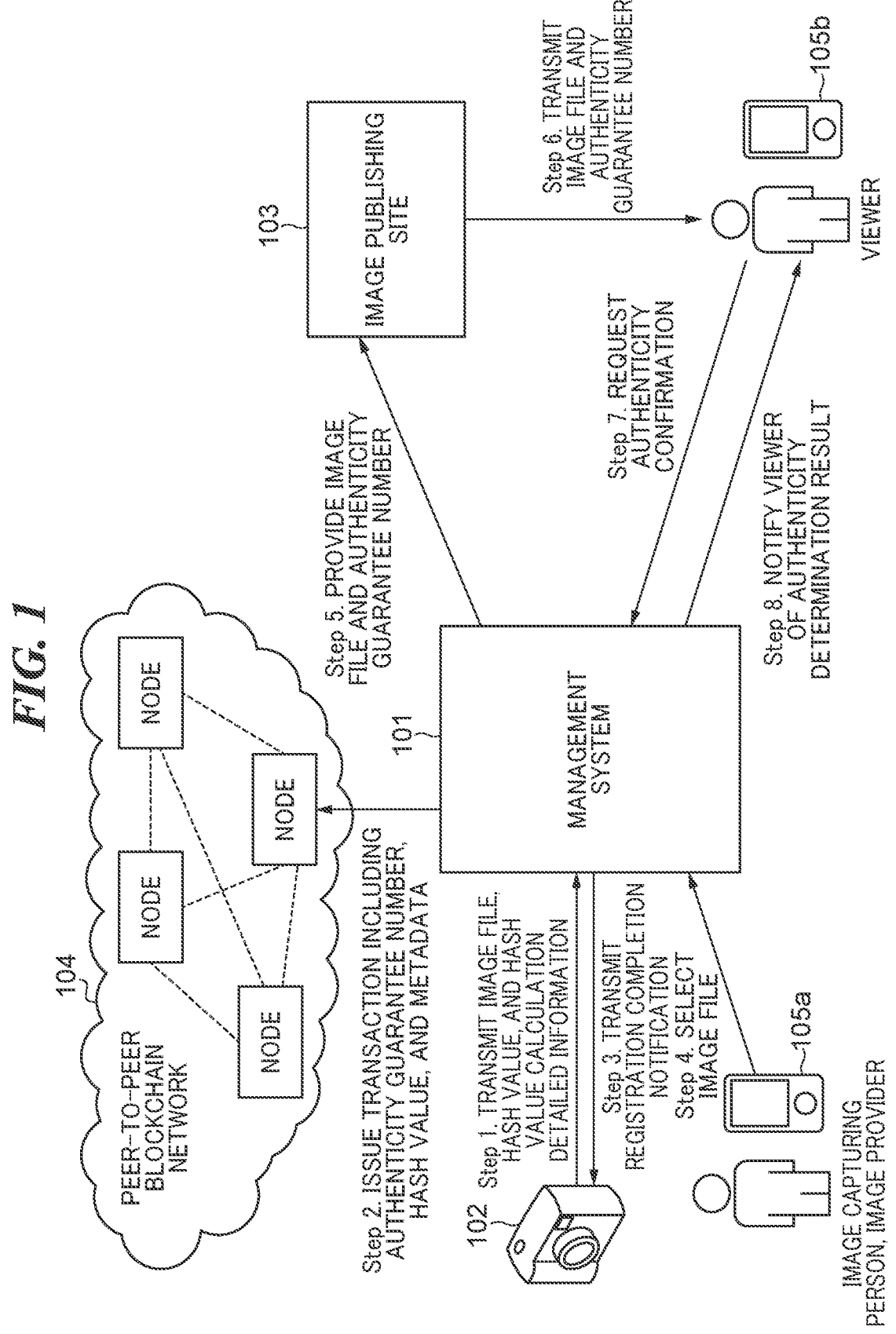
FIG. 1 is a view showing functions of a content management system according to an embodiment.

Hereafter, some exemplary embodiments according to the present disclosure will be described in detail by referring to the drawings.

FIG. 1 is a view showing functions of a content management system (hereinafter referred to as a "management system") 101 according to an embodiment.

The management system 101 has a function of managing a content obtained from an external device, such as an image capturing apparatus 102, via the Internet or the like. The management system 101 is achieved by one or more computer devices. In this embodiment, a configuration in which the management system 101 further communicates with and uses a peer-to-peer blockchain network 104 will be described. However, the present disclosure is not limited to this configuration and may be achieved by using another network.

As shown in FIG. 1, when capturing an image, the image capturing apparatus 102 transmits an image file obtained by capturing, a hash value (an image hash value), and hash value calculation detailed information to the management system 101 in association with each other (step 1).

The image file includes image data and metadata. The image data is still image data or moving image data. The image data may be RAW data that has not been subjected to a development process for conversion into image data in a designated data format. Further, the image data may be image data subjected to the development process, for example, image data in a JPEG format or an MPEG format.

The metadata includes attribute information of the image data indicating an image capturing person, an image capturing time, an image capturing location, a model of the image capturing apparatus, a setting value at the time of image capturing, etc. of the image data. The hash value is obtained by executing a hash function on the image file at the time of generation.

The hash value calculation detailed information describes information indicating a thinning method when the image data included in the image file is thinned and subjected to the hash function. The thinning method includes not performing thinning. The algorithm of the hashing function to be used may be only an initially set algorithm, or one of a plurality of algorithms, such as SHA256 and MD5, may be selected. In the latter case, the algorithm used for the hash value calculation is also described in the hash value calculation detailed information.

For example, a case where the image is hashed in SHA256 is assumed. SHA256 is an algorithm for generating a hash value of 32 bytes (256 bits) by repeatedly performing an arithmetic process for each 64 bytes from the head until the end of the data. If a thinning method in which 64 bytes from the head of the image data are used for the calculation and the next 64 bytes are not used for the calculation and skipped is repeated for the entire image data, the calculation amount can be reduced to half.

The hash value calculation detailed information in this case can be expressed as "Algorithm, SHA256, Read, 64, Skip, 64" using the CSV file format, for example. When the image data is moving image data, the hash function may be applied to every other frame. The hash value calculation detailed information in this case can be expressed as "Algorithm, SHA256, SkipFrame, 1," using the CSV file format, for example.

Further, in combination with this, not all data in one frame may be used but may be thinned out. The hash value calculation detailed information in this case can be expressed as "Algorithm, SHA256, SkipFrame, 1, Read, 64, Skip, 64" using the CSV file format, for example.

The format of the hash value calculation detailed information is not limited to the CSV file format. For example, a widely used file format such as a JSON file format may be used, or an original file format may be used.

Although a configuration in which the image capturing apparatus 102 generates a hash value and transmits the hash value to the management system 101 will be described in this embodiment, the configuration is not limited thereto. For example, the management system 101 may generate a hash value based on an image file obtained from the image capturing apparatus 102.

Upon receiving the image file, the hash value, and the hash value calculation detailed information from the image capturing apparatus 102, the management system 101 in this embodiment generates an authenticity guarantee number that is a unique number in the management system 101. The authenticity guarantee number is an identification number for uniquely identifying the image file.

The management system 101 generates transaction data that includes the image file information, such as the metadata, the hash value, and the hash value calculation detailed information, and the authenticity guarantee number, and connects a block in which the generated transaction data is written to the blockchain. Specifically, the management system 101 issues the generated transaction data and broadcasts it to one or more computers (nodes) participating in the peer-to-peer blockchain network 104 (step 2).

This enables the transaction data to be temporarily stored in a transaction pool. And verification is completed when the transaction data is approved by a miner. Then, the block in which the transaction data is written is generated and is added to the end of the blockchain. Thus, the information about the image file is registered in the blockchain.

After connecting the block in which the transaction data is written to the blockchain, the management system 101 stores (provides) the image file and the authenticity guarantee number in association with each other into an image database 407 in FIG. 4 described below. In this embodiment, the management system 101 can clip a part of frames as still image data from moving image data included in an image file stored in the image database 407 by a still image clipping device 411 in FIG. 4 described below. Hereafter, the still image data clipped from the moving image data included in the image file stored in the image database 407 will be referred to as "clipped still image data".

The management system 101 newly generates an authenticity guarantee number for the image file including the clipped still image data and stores the image file and the authenticity guarantee number in association with each other in the image database 407. As described above, in this embodiment, not only an image file including still image data obtained by still image capturing but also an image file including cut-out still image data is stored in the image database 407.

The management system 101 transmits a registration completion notification indicating that the process of registering the information about the image file in the blockchain is completed to the image capturing apparatus 102 (step 3). Thereafter, the management system 101 causes a user (for example, an image capturing person (image provider)) to select an image file to be published on an image publishing site 103 from a plurality of image files registered in the image database 407 (step 4). Specifically, the user can access a WEB page of the management system 101 from a communication device 105*a* operated by the user and select an image file to be published on the image publishing site 103 on the WEB page.

The management system 101 provides the image file selected by the user and the authenticity guarantee number associated with the image file to the image publishing site 103 (step 5). At the same time, the management system 101 notifies the communication device 105*a* that the image file selected by the user in the step 4 can be published on the image publishing site 103.

The image publishing site 103 performs display control such that the authenticity guarantee number provided together with the image file from the management system 101 is displayed in the vicinity of the image file on the WEB page, for example. This display position of the authenticity guarantee number is merely an example, and the authenticity guarantee number may be displayed at a position where a viewer of the image disclosure site 103 can recognize that the authenticity guarantee number corresponds to the image file.

A viewer of the image publishing site 103 may want to confirm that the image file displayed on the web page of the image publishing site 103 has not been tampered with since the time of capturing. In this case, the viewer first obtains (downloads) the image file and the authenticity guarantee number associated therewith from the image publishing site 103 using the communication device 105*b* (step 6).

Specifically, the viewer accesses the WEB page of the image publishing site 103 from the communication device 105*b*, selects an image file published on the WEB page, and issues a download instruction. Upon receiving this instruction, the image publishing site 103 transmits the selected image file and the authenticity guarantee number to the communication device 105*b*.

When the download is completed, the communication device 105*b* (a first communication device) transmits an authenticity confirmation request for the image file to the management system 101 together with the obtained image file and authenticity guarantee number (step 7). In this embodiment, the authenticity confirmation request is transmitted when the viewer operates the communication device 105*b* to enter the image file and the authenticity assurance number obtained from the image publishing site 103 into an input form provided by the management system 101. However, the authenticity confirmation request is not limited to the method of this embodiment, and may be performed by transmitting an e-mail to which the image file and the authenticity guarantee number are attached to the management system 101.

When the authenticity confirmation request is transmitted from the communication device 105*b*, the management system 101 determines the authenticity of the image file that is the target of the authenticity confirmation request. In this example, the authenticity is determined when the management system 101 accepts the authenticity confirmation request for the image displayed on the image publishing site

103 from the communication device 105*b* of the viewer of the image publishing site 103. However, the timing is not limited to this.

For example, the management system 101 may periodically determine the authenticity based on the image database 407. The management system 101 displays the authenticity determination result on the web page of the management system 101 or notifies the communication device 105*b* of the authenticity determination result by an e-mail (step 8).

In this embodiment, when an image file subjected to the authenticity determination includes a clipped still image, the communication device 105*b* may be notified of information about an image file including a moving image that is a source of the clipped still image together with the authenticity determination result. The information related to the image file including the moving image data of the clipping source is, for example, the authenticity guarantee number of the image file or the frame number indicating the frame clipped as the clipped still image data from the image file.

Figure 2:
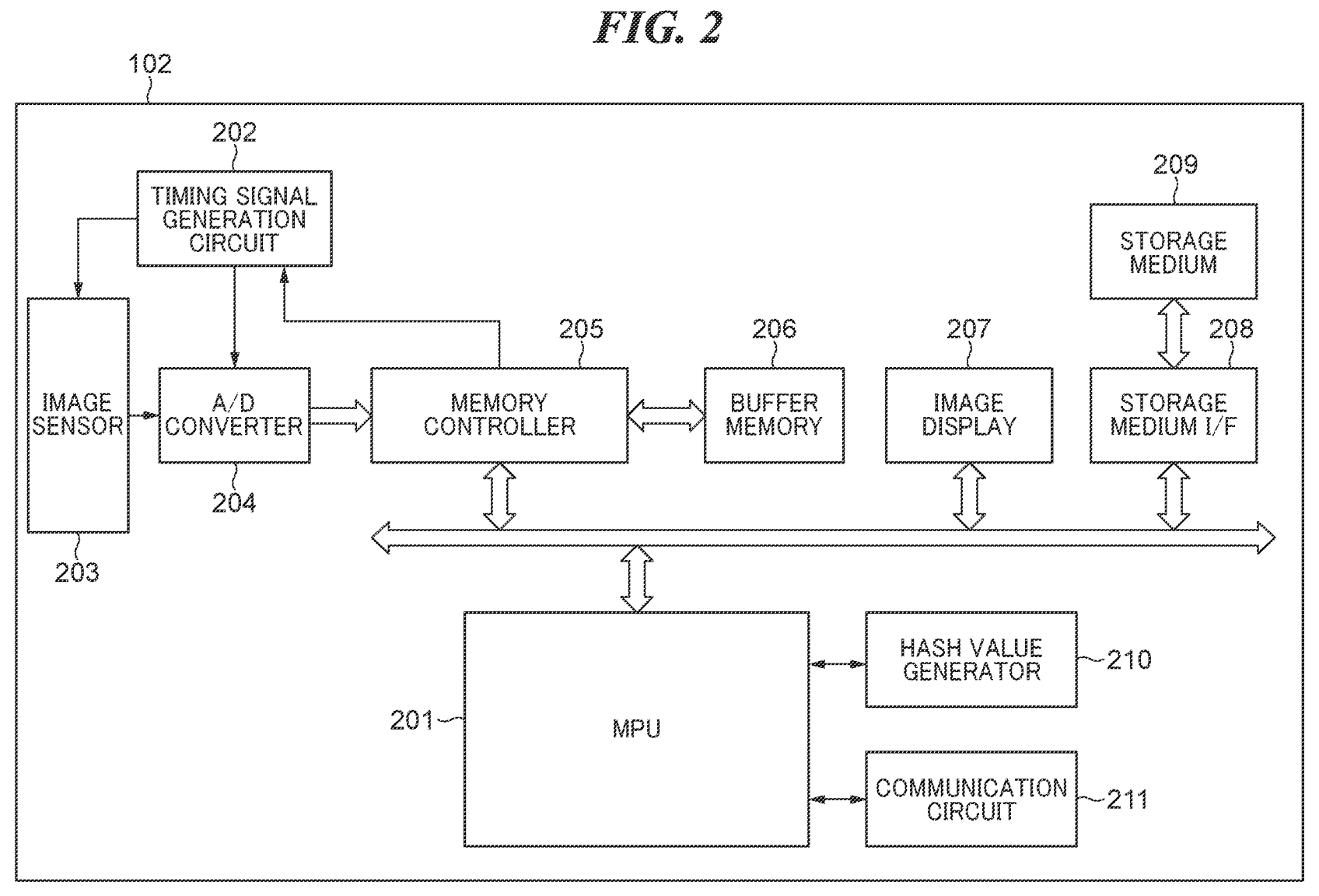

FIG. 2 is a block diagram schematically showing a configuration of the image capturing apparatus 102 in FIG. 1. The image capturing apparatus 102 is a camera, such as a digital camera or a digital video camera, or an electronic apparatus having a camera function, such as a mobile phone or a camera-equipped computer having a camera function.

As shown in FIG. 2, the image capturing apparatus 102 includes an MPU 201, a timing signal generation circuit 202, an image sensor 203, an A/D convertor 204, a memory controller 205, a buffer memory 206, and an image display 207. The image capturing apparatus 102 also includes a storage medium I/F 208, a storage medium 209, a hash value generator 210, and a communication circuit 211.

The MPU 201 is a microcontroller for controlling a sequence of the image capturing apparatus 102, such as an image capturing sequence.

The timing signal generation circuit 202 generates timing signals required to operate the image sensor 203.

The image sensor 203 is an element, such as a CCD or a CMOS, that converts reflected light from an object into an electrical signal (analog image data) and outputs the electrical signal to the A/D converter 204.

The A/D converter 204 converts the analog image data output from the image sensor 203 into digital image data. Hereinafter, the digital image data is simply referred to as "image data".

The memory controller 205 controls reading and writing of an image file from and to the buffer memory 206, a refresh operation of the buffer memory 206, etc. This image file, which includes image data and its metadata added thereto, is generated by the MPU 201. Details will be described later.

The buffer memory 206 stores an image file. The image display 207 displays an image file stored in the buffer memory 206.

The storage medium I/F 208 is an interface for controlling reading and writing data from and to the storage medium 209.

The recording medium 209 is a device, such as a memory card, that can be inserted to and removed from the image capturing apparatus 102, and stores a program, an image file, etc.

The hash value generator 210 performs a hash function to the image file stored in the buffer memory 206 to generate (calculate) a hash value. The MPU 201 may generate the hash value instead of the hash value generator 210. The hash value may be generated by performing the hash function to the image data instead of the image file.

The communication circuit 211 is connected to the Internet and transmits and receives data to and from the external device.

Figure 3:
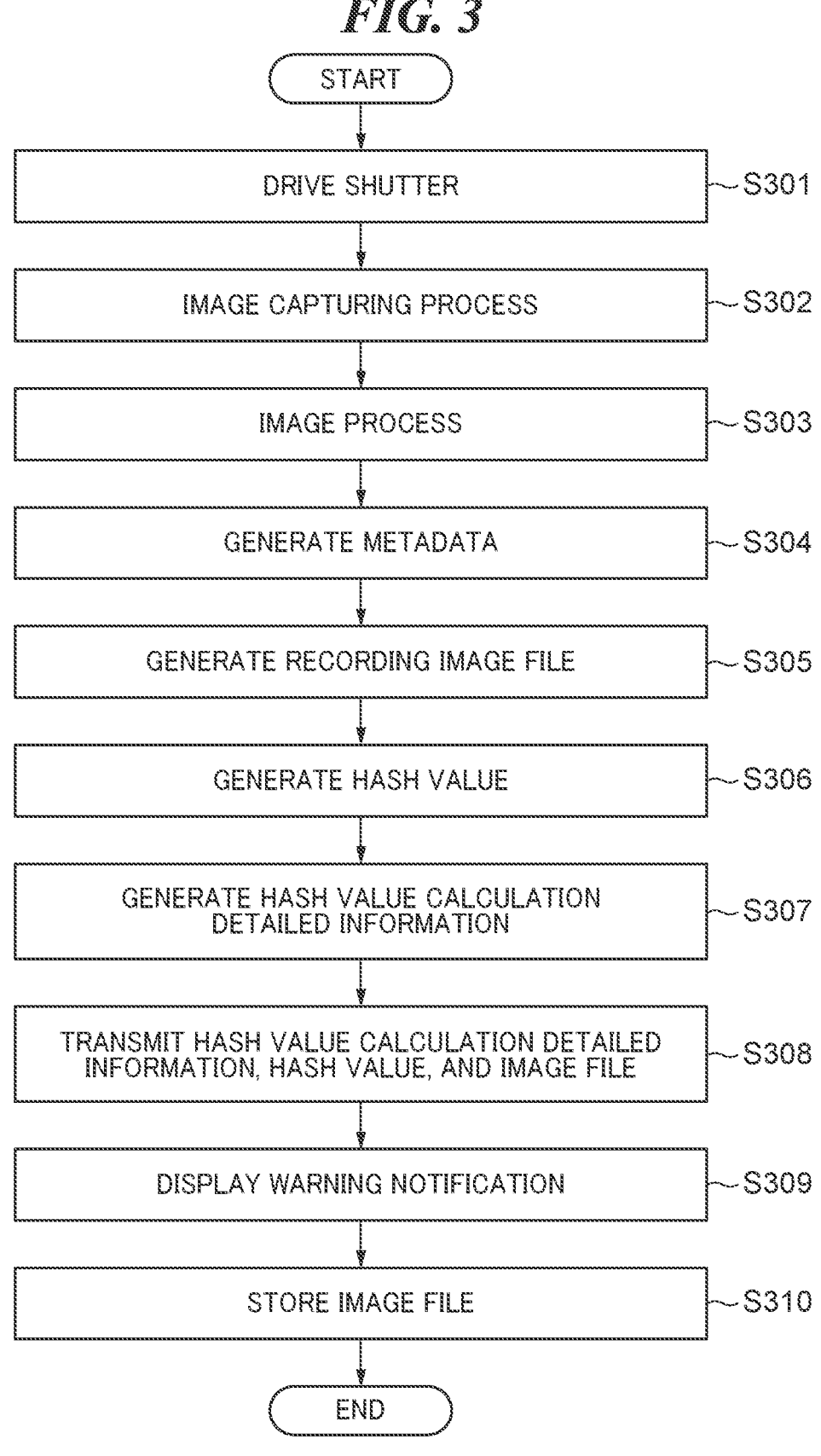
FIG. 3 is a flowchart showing a procedure of a data transmission process performed by the image capturing apparatus in FIG. 1.

FIG. 3 is a flowchart showing a procedure of a data transmission process performed in the image capturing apparatus 102 in FIG. 1. The data transmission process in FIG. 3 is achieved by the MPU 201 of the image capturing apparatus 102 executing a program stored in the storage medium 209 etc. The data transmission process in FIG. 3 is started when the image capturing apparatus 102 receives an image capturing start operation, such as pressing of an image capturing button of the image capturing apparatus 102, by an image capturing person.

As shown in FIG. 3, the MPU 201 drives a shutter (not shown) disposed on an object side of the image sensor 203 to control the exposure time (step S301). In the step S301, when the image capturing person performs the image capturing start operation for moving image capturing, the MPU 201 drives a microphone (not shown) for recording sound together with the shutter.

Next, the MPU 201 performs an image capturing process in which the image sensor 203 converts light from the object received through the shutter into an electrical signal (an analog image signal) (step S302).

Next, the MPU 201 applies an image process, such as encoding, to the electrical signal obtained by the image capturing process (step S303). As a result, image data (RAW data) to which a development process has not been performed is generated. In a case where the image capturing person has designated a data format, such as JPEG or MPEG, the developing process is further executed in the step S303 to generate developed image data, that is, an image data in the data format designated by the image capturing person.

Next, the MPU 201 generates metadata including attribute information (an image capturing person, an image capturing time, an image capturing location, a model of the image capturing apparatus, a setting value in capturing the image, etc.) in performing the image capturing process for generating the image data (step S304).

The MPU 201 then generates an image file by adding the metadata to the image data (step S305). For example, when the development process has not been executed, an image file (hereinafter referred to as an "undeveloped image file") in which metadata is added to RAW data is generated. When the data format, such as JPEG or MPEG, is designated by the image capturing person, an image file (hereinafter referred to as a "developed image file") in which the metadata is added to image data in the data format designated by the image capturing person is generated.

The MPU 201 then controls the hash value generator 210 to perform the hash function to binary data of the generated image file to generate a hash value (step S306). When the image capturing apparatus 102 is set so as to transmit both the undeveloped image file and the developed image file, the hash function is executed to the undeveloped image file and the developed image file in the step S306. As a result, two hash values corresponding to the respective image files are generated.

In generating (calculating) a hash value, the hash value may be generated while skipping a part of the binary data of the image file. In this case, the MPU 201 generates hash value calculation detailed information that records how the binary code of the image file is skipped (a thinning method) (step S307).

Next, the MPU 201 controls the communication circuit 211 to transmit the hash value and the image file to the management system 101 (step S308). At this time, when the hash value calculation detailed information is generated in the step S307, it is also transmitted to the management system 101. The information transmitted in the step S308 may be encrypted. Further, the MPU 201 causes the image display 207 to display a warning notification (step S309).

For example, the warning notification is displayed on the image display 207 until a registration completion notification is received from the management system 101. The warning notification is, for example, a notification for calling attention so that the storage medium 209 is not inserted or removed until registration to the blockchain is completed. This can prevent the process of registering the information about the image file into the blockchain or the process of adding registered information to the image file, which will be described later, from failing due to the insertion or removal of the storage medium 209.

Next, the MPU 201 stores the image file into the storage medium 209 (step S310) and ends the process.

As described above, in this embodiment, when the image capturing apparatus 102 performs the image capturing process, the image file including the image data and the metadata is recorded into the storage medium 209 and the image file and the hash value thereof are transmitted to the management system 101. If the hash value calculation detailed information is generated in the step S307, it is also transmitted to the management system 101.

FIG. 4 is a block diagram schematically showing a configuration of the management system 101 in FIG. 1. In this embodiment, the management system 101 is constituted by one or more computers connected to a network.

As shown in FIG. 4, the management system 101 includes a controller 400, a data receiver 401, a data transmitter 402, an authenticity guarantee number generator 403, and a transaction generator 404. Further, the management system 101 includes a block generator 405, a blockchain manager 406, an image database 407, a hash generator 408, a hash comparator 409, an image processor 410, and a still image clipping device 411.

The controller 400 controls the entire management system 101. The data receiver 401 receives various data from the external device. For example, the data receiver 401 receives the hash value, the hash value calculation detailed information, and the image file from the image capturing apparatus 102. In addition, the data receiver 401 receives the image file and the authenticity guarantee number for determining the authenticity from the communication device 105_b_ that is operated by the viewer of the image publishing site 103.

The data transmitter 402 transmits various types of data to the external device. For example, the data transmitter 402 sends the image file selected to be published on the image publishing site 103 and the corresponding authenticity guarantee number to the communication device 105_a_ operated by the user (e.g., the image capturing person (image provider)). The data transmitter 402 also sends the results of the authenticity determination to the communication device 105_b_ that is operated by the viewer who performed the authenticity confirmation request for the image file.

When receiving the hash value and the image file from the image capturing apparatus 102, the authenticity guarantee number generator 403 generates the authenticity guarantee number that is a unique number within the management system 101. When an undeveloped image file and a developed image file are transmitted from the image capturing apparatus 102, the authenticity guarantee number generator

403 generates authenticity guarantee numbers for the undeveloped image file and the developed image file, respectively.

The transaction generator 404 generates transaction data and broadcasts it to one or more computers (nodes) participating in the peer-to-peer blockchain network 104. The transaction data includes the hash value received from the image capturing apparatus 102, the authenticity guarantee number that is generated in receiving the hash value and is associated with the hash value, and the metadata included in the image file. The transaction data of the image file including the clipped still image data may include, for example, information about the image file including the moving image data from which the still image is clipped in addition to the hash value, the metadata, and the authenticity guarantee number of the image file.

When the broadcasted transaction data is approved by a miner and verification thereof is completed, the block generator 405 generates a block in which the transaction data is written and connects the block to the blockchain.

The blockchain manager 406 manages the blockchain held by one or more computers (nodes) participating in the peer-to-peer blockchain network 104. Further, the management system 101 and each node are synchronized so that the blockchain held by each node always has the same content.

In the image database 407, an image file and an authenticity guarantee number corresponding to the image file are registered. Specifically, the image database 407 includes a block ID field 501, an authenticity guarantee number field 502, and an image file name field 503 as shown in FIG. 5. Contents set in the fields in the same line are mutually associated.

A block ID (an ID number), which is issued in sequence each time a block in which an image file is written is connected to the blockchain, is set in the block ID field 501. That is, each block ID set in the block ID field 501 corresponds to one of the hash values registered in the blockchain.

The authenticity guarantee number corresponding to the image file is set in the authenticity guarantee number field 502.

A file name of an image file received by the management system 101 from the image capturing apparatus 102 etc. is set in the image file name field 503.

The configuration of the image database 407 is not limited to the configuration described above, and the image database 407 may include other fields.

Referring back to FIG. 4, when determining the authenticity, the hash generator 408 generates a hash value by executing the hash function to the image file transmitted from the communication device 105*b* of the user (viewer) who has made the authenticity confirmation request.

The hash comparison unit 409 obtains a block (described later) corresponding to the authenticity guarantee number transmitted from the user who has made the authenticity confirmation request from the blockchain managed by the blockchain manager 406. Then, the hash value (image hash value) written in the block of the blockchain is obtained. The hash comparator 409 compares the hash value obtained from the block with the hash value generated by the hash generator 408 to determine the authenticity. When these two hash values are equal, the hash comparator 409 determines that the image file transmitted from the user who has made the authenticity confirmation request has not been tampered with (is authentic) since the generation of the image file. In the meantime, when these two hash values are different from each other, the hash comparator 409 determines that the image file transmitted from the user who has made the authenticity confirmation request has been tampered with (not true/false) since the generation of the image file.

For example, an image file delivered from the image publishing site 103 to the communication device 105*b* may have been tampered with and the tampered image file may be transmitted to the management system 101 together with the authenticity confirmation request. When there is such an authenticity confirmation request, the hash value generated by the hash generator 408 executing the hash function to the image file is different from the hash value generated from the image file before tampering.

Also, in the management system 101, no one can change the hash value stored in the blockchain. Therefore, when there is the authenticity confirmation request, the hash value generated for the image file by the hash generator 408 does not match the hash value stored in the block corresponding to the authenticity guarantee number of the authenticity confirmation request in the blockchain.

The image processor 410 performs edition processes, such as a development process and predetermined image processes, using the image file received from the image capturing apparatus 102. For example, the image processor 410 performs the development process to RAW data included in an undeveloped image file received from the image capturing apparatus 102 to generate image data in the JPEG format, the MPEG format, or the like.

Such a process generates an edited image file including image data in the JPEG format, the MPEG format, or the like. In addition, the image processor 410 performs the predetermined image processes, such as an image trimming process and adjustment processes for brightness, color, sharpness, etc., to the image data in the JPEG format, the MPEG format, or the like included in the developed image file received from the image capturing apparatus 102. The image processor 410 converts (compresses) the processed image data into image data in the JPEG format, the MPEG format, or the like again. As a result of such processes, an edited image file including the image data in the JPEG format, the MPEG format, or the like and subjected to the predetermined image processes is generated.

The image processor 410 is constituted by one or more computers connected to the network. A user (for example, an image capturing person (image provider)) accesses the management system 101 from the communication device 105*a*, and selects an image file to be subjected to the edition processes from among a plurality of image files registered in the image database 407.

As described above, since the user selects the image file to be subjected to the edition processes from among the plurality of image files registered in the image database 407, a source of a pre-edition image file can be guaranteed (limited to the image database 407). Further, the user accesses the management system 101 from the communication device 105*a* to instruct the edition and to confirm an edition result.

In addition, the image processor 410 holds information indicating an edition content in the edition process, for example, in a metadata format. In this embodiment, the management system 101 controls so that an image file being edited or an edited image file will not be downloaded (copied) to the communication device 105*a* etc. via the data transmitter 402. This guarantees the uniqueness of the image file being edited or the edited image file.

The still image clipping device 411 clips a frame indicated by the designated frame number from the moving image data included in the designated image file to generate a clipped still image data, and generates an image file in the JPEG format, the MPEG format, or the like including the clipped still image data. The still image clipping device 411 is constituted by one or more computers connected to the network.

The user can select one of the plurality of image files registered in the image database 407 using the communication device 105_a_ etc. and can designate a frame number indicating a frame to be clipped from the moving image data included in the selected image file. The still image clipping device 411 holds the setting information about a still image clipping request, such as the information about the designated image file and the frame number, for example, in the metadata format.

Thereafter, the setting information about the still image clipping request is output together with the image file in registering the information about the image file including the clipped still image data generated based on the frame number in the blockchain. In this embodiment, a target from which still image data is clipped by the still image clipping device 411 is limited to only an image file registered in the image database 407. This can guarantees the source of the image file of the generation source of the clipped still image data and can be guarantees that the clipped still image data is not generated by malicious tampering.

Figure 6:
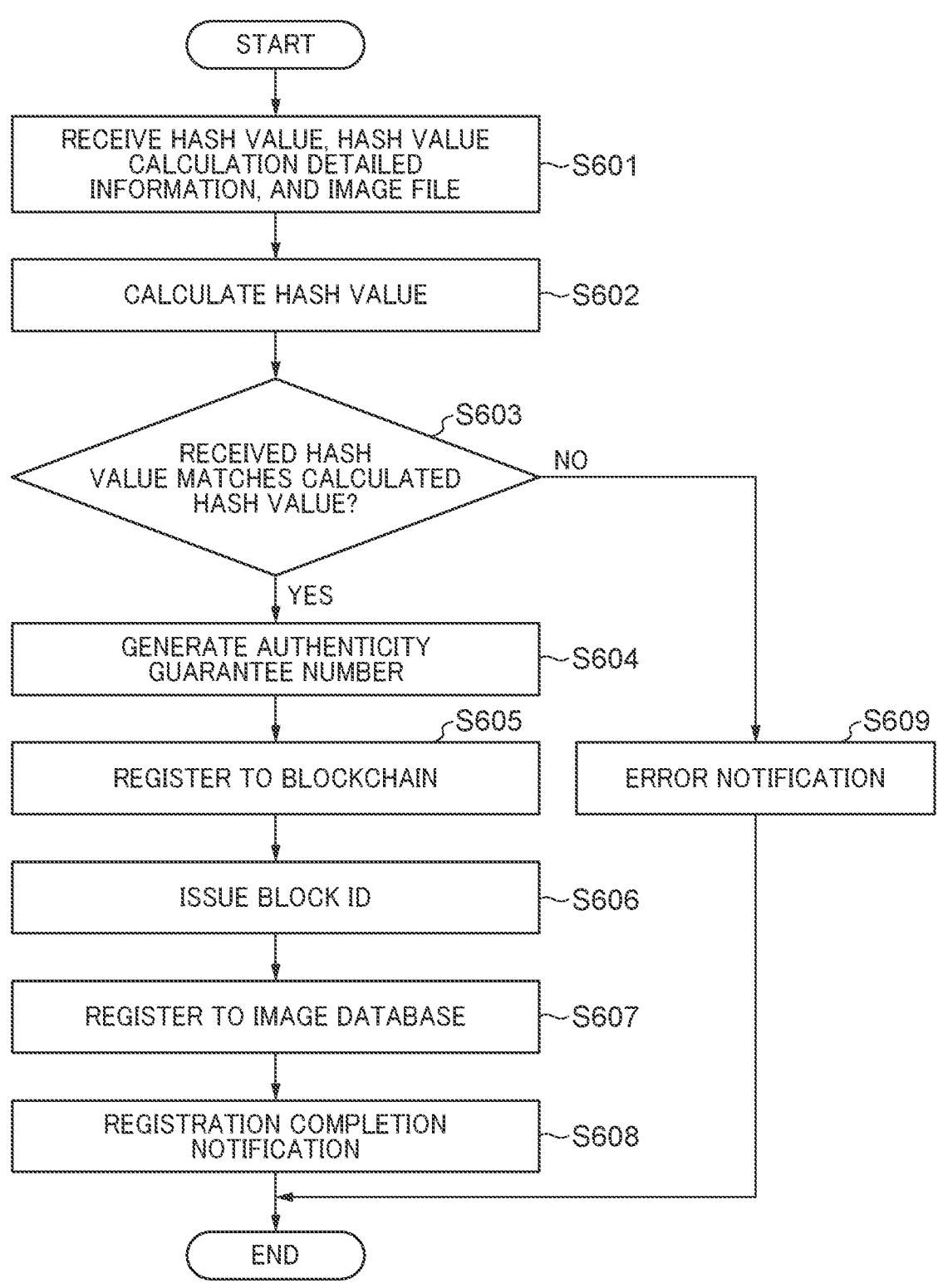
FIG. 6 is a flowchart showing a procedure of a blockchain registration process performed by the content management system in FIG. 1.

FIG. 6 is a flowchart showing a procedure of a blockchain registration process performed by the management system 101 in FIG. 1. The blockchain registration process in FIG. 6 is achieved by the controller 400 executing a program stored in a storage medium included in a computer constituting the management system 101.

The blockchain registration process in FIG. 6 is executed, for example, when the image capturing apparatus 102 transmits the hash value and the image file in the step S308 of the data transmission process in FIG. 3. Hereinafter, a case where the hash value calculation detailed information is generated in the step S307 and the hash value calculation detailed information is transmitted to the management system 101 together with the hash value and the image file in the step S308 will be described.

As shown in FIG. 6, the controller 400 receives a hash value, hash value calculation detailed information, and an image file from the image capturing apparatus 102 (step S601). If the received data has been encrypted, the controller 400 decrypts the received data. Thereafter, the controller 400 stores the hash value, the hash value calculation detailed information, and the metadata included in the received image file in a RAM (not shown).

Next, the controller 400 applies a thinning process based on the hash value calculation detailed information to the image file received in the step S601. Then, the hash value is calculated by applying the hash function to the thinned image file (step S602). In step S603, the controller 400 determines whether the hash value received in the step S601 matches the hash value calculated in the step S602.

If the hash values match as a result of the determination in the step S603, the process proceeds to step S604 described below. If the hash values do not match as a result of the determination in the step S603, the process proceeds to step S609. In the step S609, the controller 400 issues an error notification indicating that registration in the blockchain is not possible. Thereafter, this process is ended.

In the step S604, the controller 400 controls the authenticity guarantee number generator 403 to generate an authenticity guarantee number for the received image file.

Next, the controller 400 registers the authenticity guarantee number generated in the step S604, the hash value stored in the RAM in the step S601, the hash value calculation detailed information, and the metadata in the blockchain (step S605). Specifically, the transaction generator 404 first generates transaction data that includes the authenticity guarantee number, the hash value, the hash value calculation detailed information, and the metadata.

The transaction generator 404 then broadcasts the transaction data to one or more computers (nodes) participating in the peer-to-peer blockchain network 104. When the broadcasted transaction data is approved by the miner and the verification is completed, the block generator 405 generates a block in which the verified transaction data is written and connects (registers) the block to the blockchain.

The controller 400 then issues a block ID corresponding to the block (step S606). At this time, the controller 400 issues a value, which is generated by executing the hash function twice to the header of the block, as the block ID. The block ID is used to refer to the block, but there is no block ID field in the block.

Next, the controller 400 registers the issued block ID, the image file received in the step S601, and the authenticity guarantee number generated in the step S604 in the image database 407 in association with each other (step S607). Next, the controller 400 transmits a registration completion notification indicating that the process of registering the information about the image file in the blockchain is completed to the image capturing apparatus 102 (step S608). Thereafter, the blockchain registration process ends.

Figure 7:
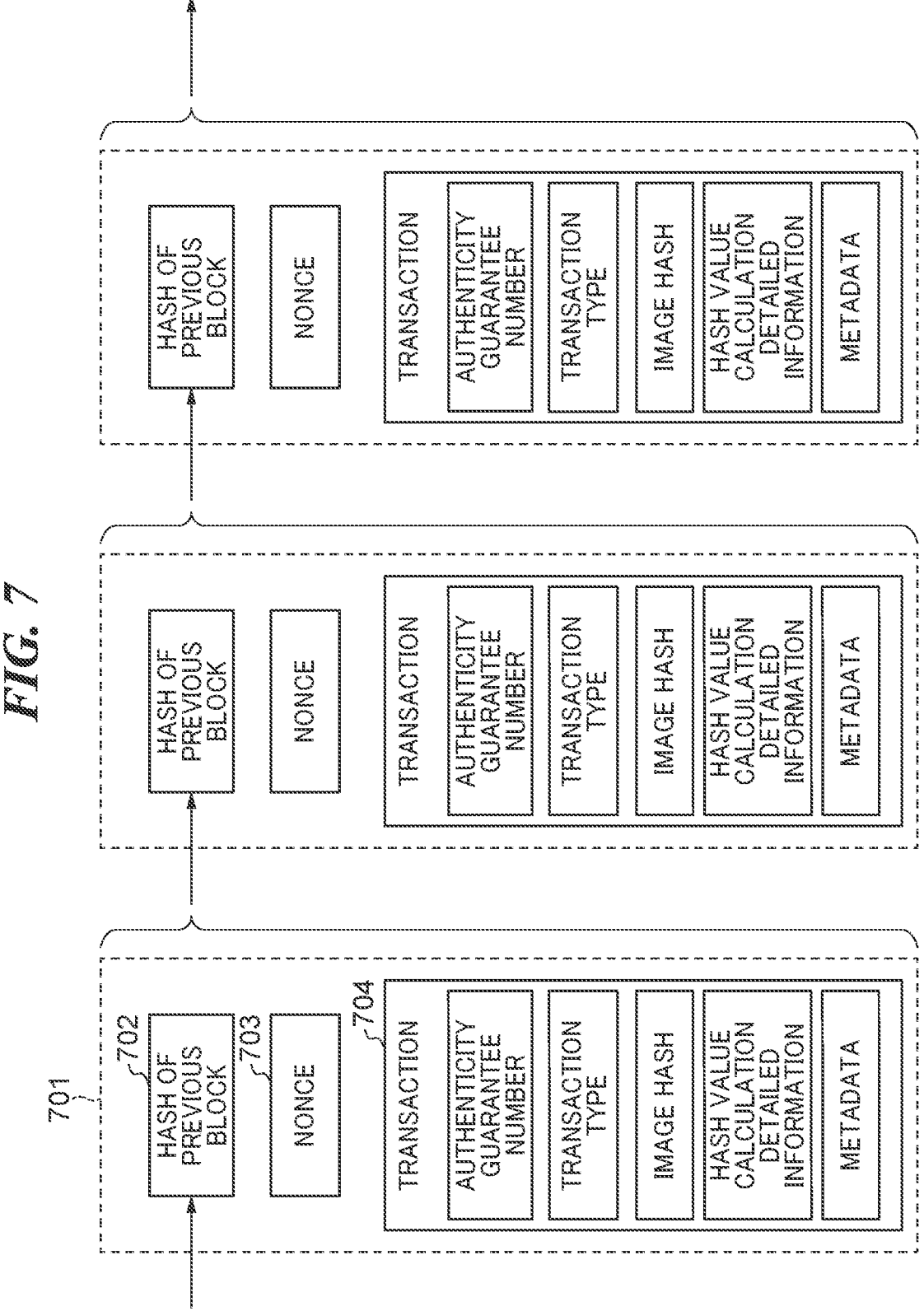
FIG. 7 is a view showing an example of a block data structure of the blockchain managed by a blockchain manager in FIG. 4.

FIG. 7 is a view showing an example of a block data structure of the blockchain managed by the blockchain manager 406 in FIG. 4. As shown in FIG. 7, the blockchain is a database formed by connecting blocks in a time series like a chain. A block 701 connected to the blockchain includes a hash 702, a nonce 703, and a transaction 704 of the previous block.

The hash 702 of the previous block is the hash value of the block connected to the blockchain one block before the block 701. The nonce 703 is a nonce value used for mining.

The transaction 704 is transaction data generated by the transaction generator 404 and includes a transaction type, an image hash, an authenticity guarantee number, hash value calculation detailed information, and metadata.

The transaction type is information indicating a type of a transaction. An internal structure of a transaction depends on the transaction type.

The image hash is a hash value transmitted from the image capturing apparatus 102 to the management system 101 or a hash value of an image file including the clipped still image data generated by the still image clipping device 411.

The authenticity guarantee number is generated by the management system 101 when the image hash is transmitted from the image capturing apparatus 102 to the management system 101 or when the image file including the clipped still image data is generated.

The hash value calculation detailed information represents a hash value transmitted from the image capturing apparatus 102 to the management system 101.

The metadata is included in an image file. The transaction 704 of the block corresponding to the image file including the clipped still image data further includes the authenticity guarantee number of the clipping-source image file and the frame number indicating the frame clipped from the clipping-source image file.

Figure 8:
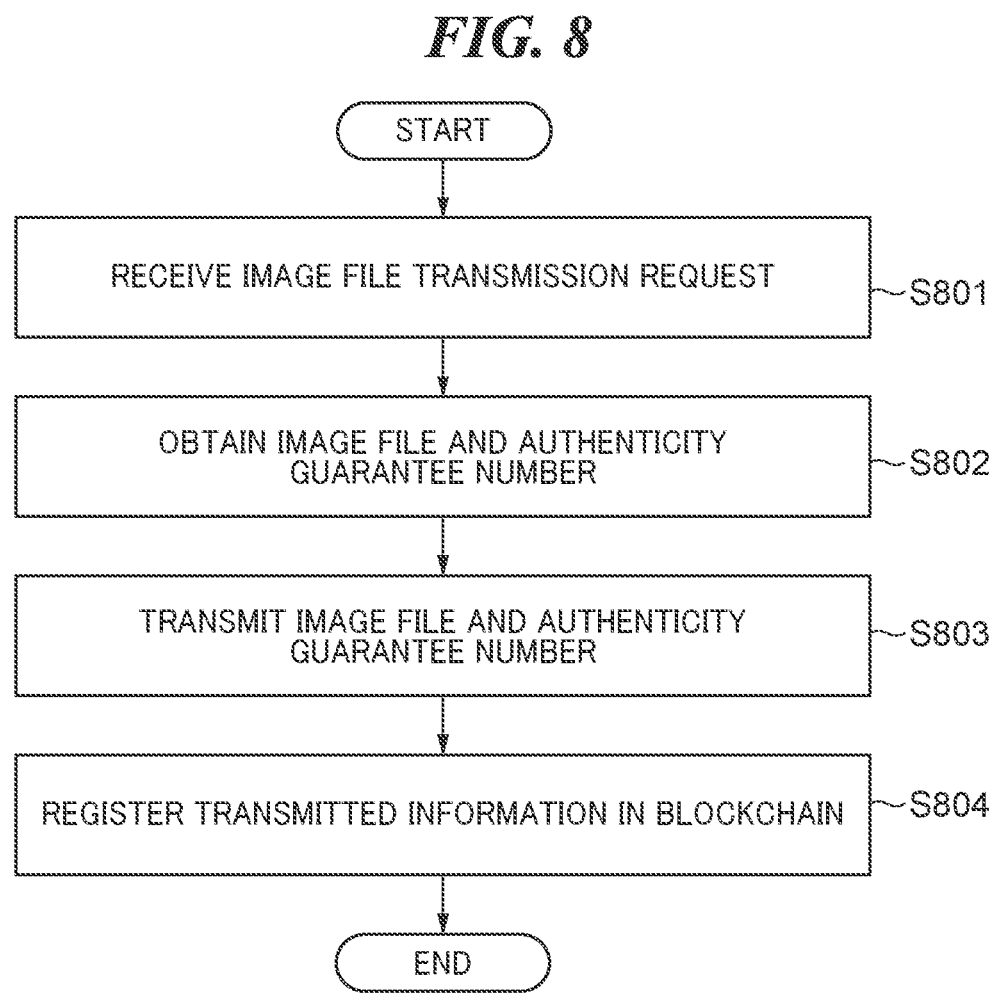

FIG. 8 is a flowchart showing a procedure of an image file transmission process executed in the management system 101 in FIG. 1 to transmit the image file to the image publishing site 103. The image file transmission process in FIG. 8 is also achieved by the controller 400 executing a program stored in the storage medium of the computer included in the management system 101. The image file transmission process in FIG. 8 is executed, for example, when a user (for example, an image capturing person) selects one of a plurality of image files registered in the image database 407 using the communication device 105*a* and requests transmission of the image file to the image publishing site 103. This transmission request includes the block ID associated with the image file selected by the user in the image database 407.

As shown in FIG. 8, first, the controller 400 receives the transmission request from the communication device 105*a* operated by the user with the data receiver 401 (step S801).

Next, the controller 400 obtains the image file that is the target of the transmission request and the authenticity guarantee number of the image file from the image database 407 (step S802). Specifically, the image file and the authenticity guarantee number corresponding to the block ID included in the transmission request are obtained from the image database 407.

Next, the controller 400 causes the data transmitter 402 to transmit the obtained image file and authenticity guarantee number to the image publishing site 103 (step S803). In addition, the controller 400 notifies the communication device 105*a* of the user who is the requester of the transmission request that the image file as the target of the transmission request can be published on the image publishing site 103.

Next, the controller 400 registers the transmitted information about the image file in the blockchain (step S804). Specifically, first, the transaction generator 404 generates transaction data including the authenticity guarantee number, the transmitted information about the image file, the image data, and the information (URL or the like) indicating the transmission destination of the authenticity guarantee number. The transaction generator 404 then broadcasts the transaction data to one or more computers (nodes) participating in the peer-to-peer blockchain network 104. When the broadcasted transaction data is approved by the miner and the verification is completed, the block generator 405 generates a block in which the verified transaction data is written and connects the block to the blockchain. Thereafter, the image file transmission process is ended.

As described above, in the image file transmission process in FIG. 8, when an image file is transmitted from the management system 101 to the image publishing site 103 in response to a transmission request from a user, the user is notified that the image file can be published on the image publishing site 103. In addition, the transmitted information about the image file is registered in the blockchain. Therefore, the user can grasp the usage status of the image file.

Figure 9:
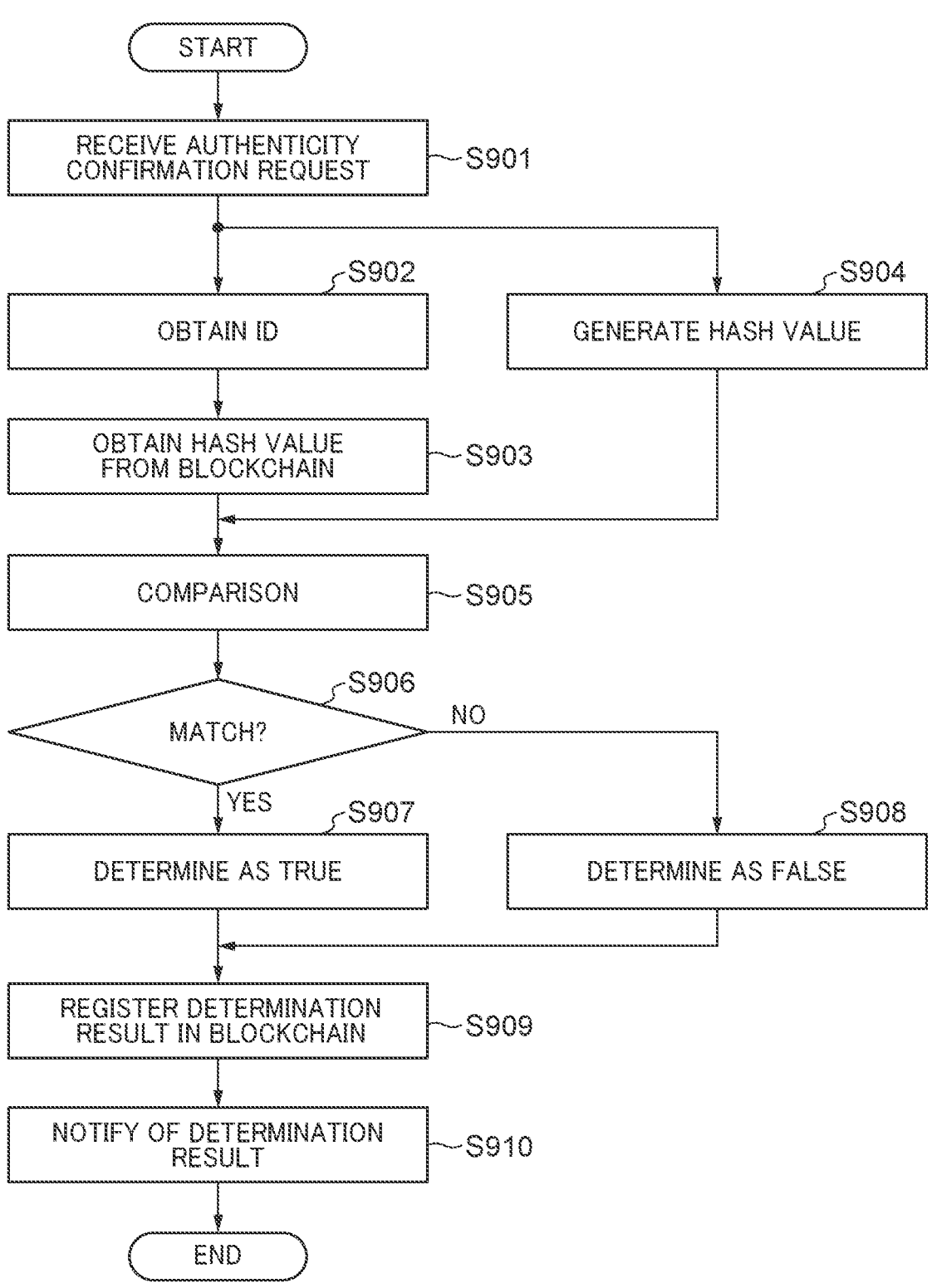
FIG. 9 is a flowchart showing a procedure of an authenticity determination process performed by the content management system in FIG. 1.

FIG. 9 is a flowchart showing a procedure of an authenticity determination process performed in the management system 101 in FIG. 1. The authenticity determination process in FIG. 9 is also achieved by the controller 400 executing a program stored in the storage medium included in a computer constituting the management system 101. The authenticity determination process in FIG. 9 is executed when the viewer of the image publishing site 103 operates the communication device 105*b* to request the management system 101 to confirm the authenticity of the image file displayed on the image publishing site 103. However, this configuration is not limiting.

In FIG. 9, the controller 400 causes the data receiver 401 to receive the authenticity confirmation request from the communication device 105*b* operated by the viewer (step S901). At the time of the reception, the controller 400 causes the data receiver 401 to receive the image file that is an authenticity determination target and the authenticity guarantee number corresponding to the image file.

Next, the controller 400 queries the image database 407 using the authenticity guarantee number received in step S901 as a key and obtains the block ID corresponding to the authenticity guarantee number (step S902).

Next, the controller 400 accesses the block corresponding to the obtained block ID in the blockchain and obtains a hash value (an image hash value) stored in the block (step S903).

In parallel with the process in the steps S902 and S903, the controller 400 causes the hash generator 408 to execute the hash function to the image file received in the step S901 (step S904). Accordingly, the controller 400 causes the hash generator 408 to generate (obtain) a hash value. At this time, a block corresponding to the obtained block ID among the plurality of blocks constituting the blockchain is accessed, and the hash value calculation detailed information stored in the block is obtained. In the step S904, the hash value is generated with reference to the hash value calculation detailed information.

When the process in the steps S902 to S904 is completed, the controller 400 causes the hash comparator 409 to compare the image hash value obtained in the step S903 with the hash value generated in the step S904 (step S905).

The controller 400 determines whether the two hash values compared in the step S905 match (step S906).

As a result of the determination in the step S906, when the two hash values match, the controller 400 determines that the image file received in the step S901 is "true" indicating that the image file has not been tampered with since its generation (step S907). Thereafter, the process proceeds to step S909.

In the meantime, as a result of the determination in the step S906, when the two hash values do not match, the controller 400 determines that the image file received in the step S901 is "false" indicating that the image file has been tampered with since its generation (step S908). Thereafter, the process proceeds to the step S909.

Next, the controller 400 controls the block generator 405 to register the determination result in the step S907 or S908 in the blockchain (the step S909). Specifically, the block generator 405 generates a block in which the determination result in the step S907 or S908 is written and connects the block to the blockchain.

Next, the controller 400 controls the data transmitter 402 to notify the communication device 105*b*, which is the requester of the authenticity confirmation request, of the determination result (step S910). Thereafter, this process is terminated.

As described above, according to this embodiment, the following process is executed in the management system 101. First, in response to reception of an image file and a hash value at the time of generation of the image file, an authenticity guarantee number for identifying the received image file is generated, and the received hash value is registered in the blockchain in association with the authenticity guarantee number. Thereafter, in response to an authenticity confirmation request from the viewer, the hash value generated from the image file received together with the authenticity confirmation request is compared with the hash value corresponding to the authenticity guarantee number received together with the authenticity confirmation request in the blockchain. Thus, the management system 101 can easily determine the authenticity of the image file obtained by the viewer.

In the process in FIG. 6 described above, the hash value at the time of generation of the image file is registered in the blockchain. In the process in FIG. 9 described above, the authenticity of the image file is determined using this hash value. Therefore, if an edition process is not considered, it is not possible to guarantee authenticity of an image file that has been subjected to a legitimate edition process by a provider of the image file after the image file has been generated.

Accordingly, in this embodiment, an authenticity guarantee number for identifying an edited image file is generated, and the hash value of the edited image file is registered in the blockchain in association with the authenticity guarantee number.

Figure 10:
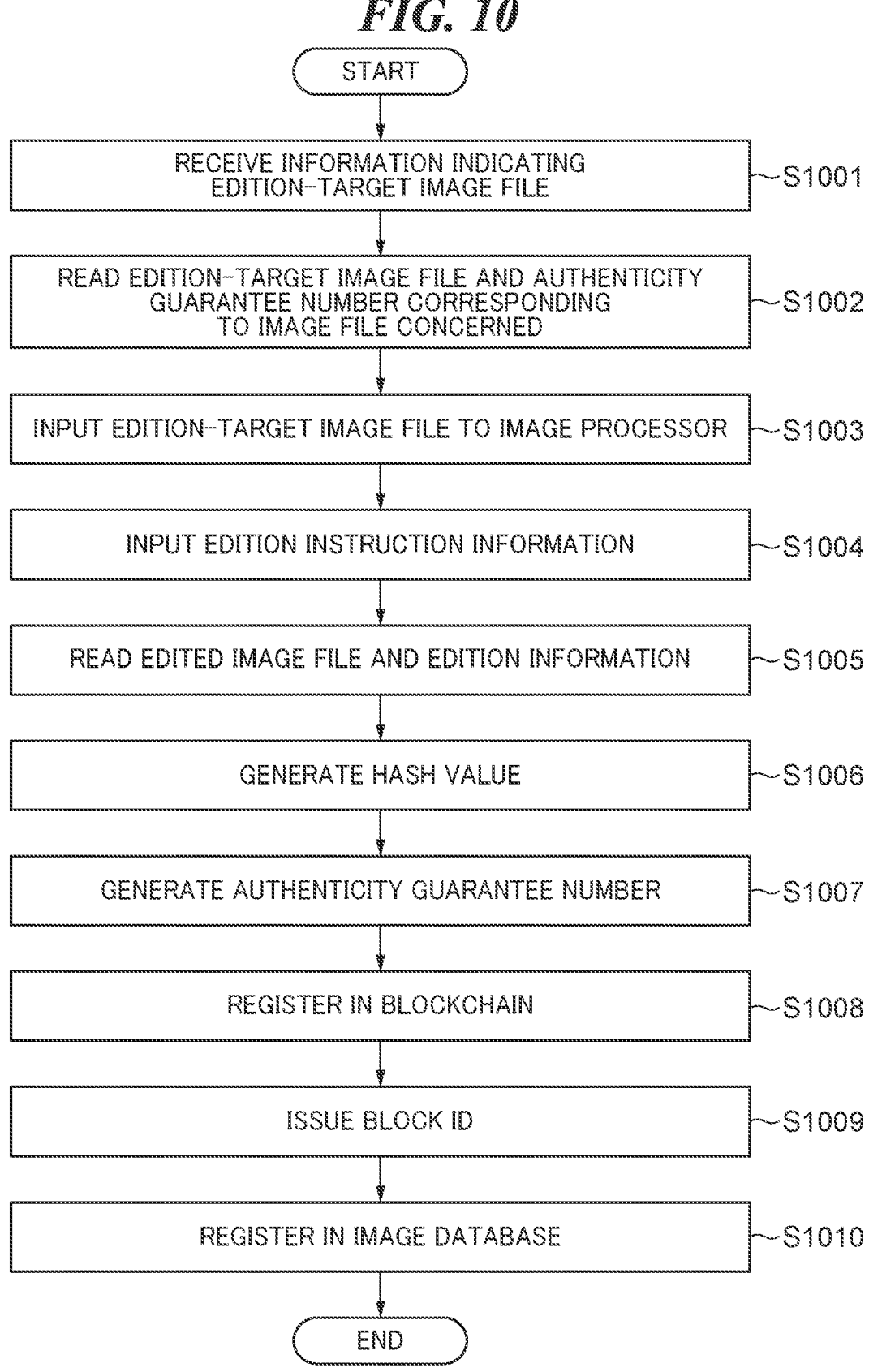
FIG. 10 is a flowchart showing a procedure of an image file edition process performed by the content management system in FIG. 1.

FIG. 10 is a flowchart showing a procedure of an image file edition process performed by the management system 101 in FIG. 1. The image file edition process in FIG. 10 is also achieved by the controller 400 executing a program stored in the storage medium of the computer included in the management system 101.

The image file edition process in FIG. 10 is executed, for example, when a user accesses the management system 101 from the communication device 105a and selects an image file as an edition target from among the plurality of image files registered in the image database 407. The user may be an administrator of the image file, such as a provider of the selected image file or a user who is authorized to edit the image file legitimately. When the user selects an image file as the edition target, information indicating the selected image file is transmitted from the communication device 105a to the management system 101.

In FIG. 10, the controller 400 receives the information indicating the image file selected by the user as the edition target (hereinafter simply referred to as an "edition-target image file") with the data receiver 401 (step S1001).

Next, the controller 400 reads the edition-target image file and the authenticity guarantee number corresponding to the edition-target image file from the image database 407 (step S1002). Next, the controller 400 inputs the image file read from the image database 407 to the image processor 410 (step S1003). The image processor 410 temporarily stores the obtained image file in the storage device (not shown) in the image processor 410.

Next, when the user inputs a setting related to edition of the edition-target image file to the communication device 105a and the data receiver 401 receives edition instruction information indicating this setting from the communication device 105a, the processing proceeds to step S1004. In the step S1004, the controller 400 inputs the received edition instruction information to the image processor 410. The image processor 410 applies the edition process to the edition-target image file based on the obtained edition instruction information.

The edition process is, for example, a development process of converting RAW data included in an undeveloped image file into image data in a data format designated by a user. The edition process is, for example, a predetermined image process, such as the trimming process or the adjustment process, executed to image data included in a developed image file. Further, the image processor 410 holds the edition information indicating edition contents in the edition process in a known format like metadata. The edition information includes, for example, information indicating what kind of edition has been performed to the pre-edition image file and difference information between the pre-edition image file and the edited image file.

The edited image file generated by the edition process is stored in the storage device in the image processor 410 together with the edition information. In this embodiment, the user can confirm the result of the edition process from the communication device 105a. For example, display data for displaying a preview of the result of the edition process instead of the edited image file itself is transmitted to the communication device 105a. The communication device 105a displays the preview of the result of the edition process based on the display data.

As described above, in this embodiment, the edited image file subjected to the edition process by the management system 101 in accordance with the instruction input to the communication device 105a by the user is stored only in the storage device in the image processor 410 and is not provided to the communication device 105a.

When the user who has confirmed the result of the edition process inputs an instruction indicating completion of the edition to the communication apparatus 105a and the data receiver 401 receives the edition completion information indicating this instruction from the communication device 105a, the process proceeds to step S1005. In the step S1005, the controller 400 reads the edited image file and the edition information from the image processor 410. In this embodiment, the configuration in which the process in the step S1005 is performed when the data receiver 401 receives the edition completion information from the communication device 105a has been described. However, this configuration is not limiting.

For example, when the user who has confirmed the result of the edition process inputs an instruction to store the edited image file to the communication device 105a and the data receiver 401 receives storage instruction information indicating this instruction from the communication device 105a, the process in the step S1005 may be executed.

Next, the controller 400 controls the hash generator 408 to perform the hash function to the edited image file to generate a hash value (step S1006). Next, the controller 400 controls the authenticity guarantee number generator 403 to generate a unique number different from the authenticity guarantee number of the pre-edition image file as the authenticity guarantee number of the edited image file (step S1007).

Accordingly, in the management system 101, the edited image file is managed as an image file different from the pre-edition image file. Next, the controller 400 controls the block generator 405 to register the authenticity guarantee number generated in the step S1007, the hash value generated in the step S1006, the edited image file and the edition information read in the step S1005, and the authenticity guarantee number of the pre-edition image file read in the step S1003 in the blockchain (step S1008).

Figure 11:
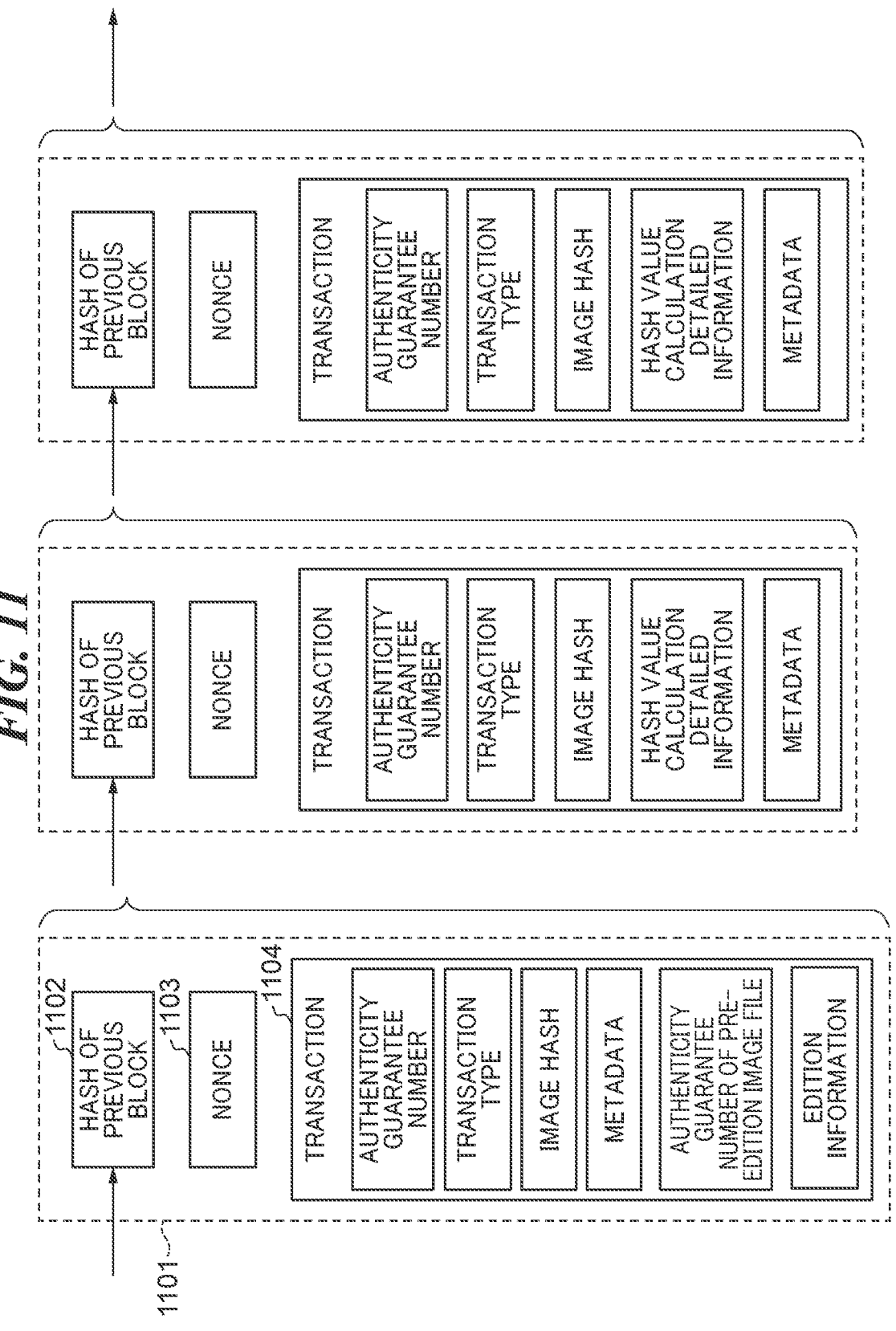
FIG. 11 is a view showing an example of a block data structure of the blockchain managed by the blockchain manager in FIG. 4.

Specifically, first, the transaction generator 404 generates transaction data including the authenticity guarantee number, the hash value, the authenticity guarantee number of the pre-edition image file, and the edition information. The transaction generator 404 then broadcasts the transaction data to one or more computers (nodes) participating in the peer-to-peer blockchain network 104. When the broadcasted transaction data is approved by the miner and the verification thereof is completed, the block generator 405 generates a block 1101 in FIG. 11 in which the verified transaction data is written. In addition, the block generator 405 connects (registers) the block 1101 to the blockchain.

The block 1101 is similar in configuration to the block 701 described above and includes a hash 1102 of a previous block, a nonce 1103, and a transaction 1104. The hash 1102 of the previous block has the same configuration as the hash 702 of the previous block described above. The nonce 1103 has a configuration similar to that of the nonce 703 described above. The transaction 1104 is transaction data generated by the transaction generator 404, and includes a transaction type, an image hash, an authenticity guarantee number, and metadata.

The transaction 1104 further includes the authenticity guarantee number of the pre-edition image file and the edition information. In this embodiment, when the hash value is generated while skipping a part of the binary data of the image file in generating the hash value in the step S1006, the above-described hash value calculation detailed information is generated. In this case, the transaction 1104 also includes the hash value calculation detailed information.

The controller 400 then issues a block ID corresponding to the block (step S1009). The procedure for issuing the block ID is the same as that of the step S604 described above. Next, the controller 400 registers the issued block ID, the edited image file read in the step S1005, and the authenticity guarantee number generated in the step S1007 in the image database 407 in association with each other (the step S1001). Thereafter, the blockchain registration process ends.

As described above, according to this embodiment, the following process is executed in the management system 101. First, according to the instruction from the administrator of the image file, the edition process is applied to the image file, and the hash value of the edited image file is generated immediately after the edited image file is generated by the edition process. Further, the authenticity guarantee number for identifying the edited image file is generated, and the hash value of the edited image file is registered in the blockchain in association with the authenticity guarantee number. Thereafter, in response to the authenticity confirmation request from the viewer, the hash value generated from the image file received together with the authenticity confirmation request is compared with the hash value corresponding to the authenticity guarantee number received together with the authenticity confirmation request in the blockchain. As a result, the authenticity of the image file edited since its generation can be determined.

In the above-described embodiment, the image file includes the image data generated by the image capturing apparatus 102 capturing the image of the object. Accordingly, it is possible to determine the authenticity of the edited image file obtained by editing the image data generated by capturing the object by the image capturing apparatus 102.

In the above-described embodiment, since the image data is undeveloped image data, the authenticity of the edited image file obtained by editing the undeveloped image data can be determined.

In the above-described embodiment, the edition process is a development process for converting undeveloped image data (RAW data) into image data in a predetermined data format. This enables determination of the authenticity of the edited image file including the image data in the predetermined data format obtained by performing the development process to the undeveloped image data.

In the above-described embodiment, since the image data is developed image data, the authenticity of the edited image file obtained by editing the developed image data can be determined.

In addition, in the above-described embodiment, the edition process is the predetermined image process applied to the developed image data. Thus, the authenticity of the edited image file including the image data obtained by applying the predetermined image process to the developed image data can be determined.

In the above-described embodiment, since the image data is still image data or moving image data, the authenticity of the edited image file obtained by editing the still image data or the moving image data can be determined.

In the above-described embodiment, the authenticity guarantee and the edition information of the pre-edition image file are registered in the blockchain in association with the hash value of the edited image file and the authenticity guarantee number of the edited image file. This enables management of the information indicating the edition content as the information related to the edited image file.

Although the present disclosure has been described using the above-described embodiments, the present disclosure is not limited to the above-described embodiments. For example, when the edition information is registered in the blockchain in association with the authenticity guarantee number received in the step S901 in the authenticity determination process in FIG. 9 described above, the controller 400 may obtain the edition information from the blockchain in the step S903.

Further, the controller 400 may notify the requester who has made the authenticity confirmation request of the edition information together with the determination result in the step S910. As a result, the viewer who has made the authenticity confirmation request can know how the image file has been edited in addition to the determination result of the authenticity of the image file.

In addition, in this embodiment, when the authenticity guarantee number of the pre-edition image file is not registered in the blockchain, the hash value of the edited image file may be controlled not to be registered in the blockchain. For example, when the authenticity guarantee number corresponding to the edition-target image file is not registered in the image database 407 and the authenticity guarantee number cannot be read in the step S1002, the controller 400 does not register the hash value of the edited image file in the blockchain in the step S1008. This enables to prevent an image file of which authenticity is not guaranteed, that is, an edited image file whose editing source is an image file that may be tampered with from being registered in the blockchain.

Next, as another example of registering an edited image file in the blockchain, a process of registering an image file including clipped still image data in the blockchain will be described.

FIG. 12 is a flowchart showing another procedure of the image file edition process performed by the management system 101 in FIG. 1. The image file edition process in FIG. 12 is similar to the image file edition process in FIG. described above, and in particular, contents different from the image file edition process in FIG. 10 described above will be described below. The image file edition process in FIG. 12 is also achieved by the controller 400 executing a program stored in the storage medium of the computer included in the management system 101.

The image file edition process in FIG. 12 is also executed, for example, when a user accesses the management system 101 from the communication device 105a and selects an edition-target image file from among the plurality of image files registered in the image database 407. The user may be an administrator of the image file, such as a provider of the selected image file or a user who is authorized to edit the image file legitimately. When the user selects the edition-target image file, a still image clipping request including information indicating the selected image file is transmitted from the communication device 105a to the management system 101.

As shown in FIG. 12, the controller 400 receives a still image clipping request with the data receiver 401 (step S1201). Next, the controller 400 reads the edition-target image file indicated by the still image clipping request from the image database 407 (step S1202). The image file includes moving image data as image data. Next, the controller 400 reads the authenticity guarantee number corresponding to the edition-target image file from the image database 407 (step S1203).

Next, the controller 400 inputs the edition-target image file read from the image database 407 to the still image clipping device 411 (step S1204). The still image clipping device 411 temporarily stores the obtained image file in a storage device (not shown) in the still image clipping device 411.

Next, when the user inputs frame information, such as a frame number of a frame to be clipped from the moving image data included in the edition-target image file, to the communication device 105a and the data receiver 401 receives clipping instruction information including the frame information from the communication device 105a, the process proceeds to step S1205.

In the step S1205, the controller 400 inputs the clipping instruction information to the still image clipping device 411. The still image clipping device 411 holds the clipping instruction information in a known format such as metadata. Further, the still image clipping device 411 applies the edition process to the edition-target image file based on the received clipping instruction information. Specifically, the still image clipping device 411 generates the clipped still image data by clipping a frame corresponding to the frame number indicated by the clipping instruction information from the moving image data included in the edition-target image file stored in the storage device in the still image clipping device 411.

The edited image file including the clipped still image data is stored in the storage device in the still image clipping device 411 together with the frame number. In this embodiment, the user can confirm the result of the edition process from the communication device 105a. For example, display data for displaying a preview of the result of the edition process instead of the edited image file itself is transmitted to the communication device 105a. The communication device 105a displays the preview of the result of the edition process based on the display data. As described above, in this embodiment, the edited image file subjected to the edition process by the management system 101 in accordance with the instruction input to the communication device 105a by the user is stored only in the storage device in the still image clipping device 411 and is not provided to the communication device 105a.

When the user who has confirmed the result of the edition process inputs an instruction indicating completion of the edition to the communication device 105a and the data receiver 401 receives clipping completion information indicating this instruction from the communication device 105a, the process proceeds to step S1206. In the step S1206, the controller 400 reads the edited image file and the frame number from the still image clipping device 411.

In this embodiment, the configuration in which the process in the step S1206 is performed when the data receiver 401 receives the clipping completion information from the communication device 105a has been described. However, this configuration is not limiting.

For example, when the user who has confirmed the result of the edition process inputs an instruction to store the edited image file to the communication device 105a and the data receiver 401 receives storage instruction information indicating this instruction from the communication device 105a, the process in the step S1206 may be executed.

Next, the controller 400 controls the hash generator 408 to apply the hash function to the edited image file to generate a hash value (step S1207). Next, the controller 400 controls the authenticity guarantee number generator 403 to generate a unique number different from the authenticity guarantee number of the clipping source image file as the authenticity guarantee number of the edited image file (step S1208).

Next, the controller 400 controls the block generator 405 to register the information about the edited image file in the blockchain (step S1209). Specifically, first, the block generator 405 generates transaction data including the authenticity guarantee number generated in the step S1208, the hash value generated in the step S1207, the authenticity guarantee number of the clipping source image file obtained in the step S1203, and the frame number obtained in the step S1206.

Figure 13:
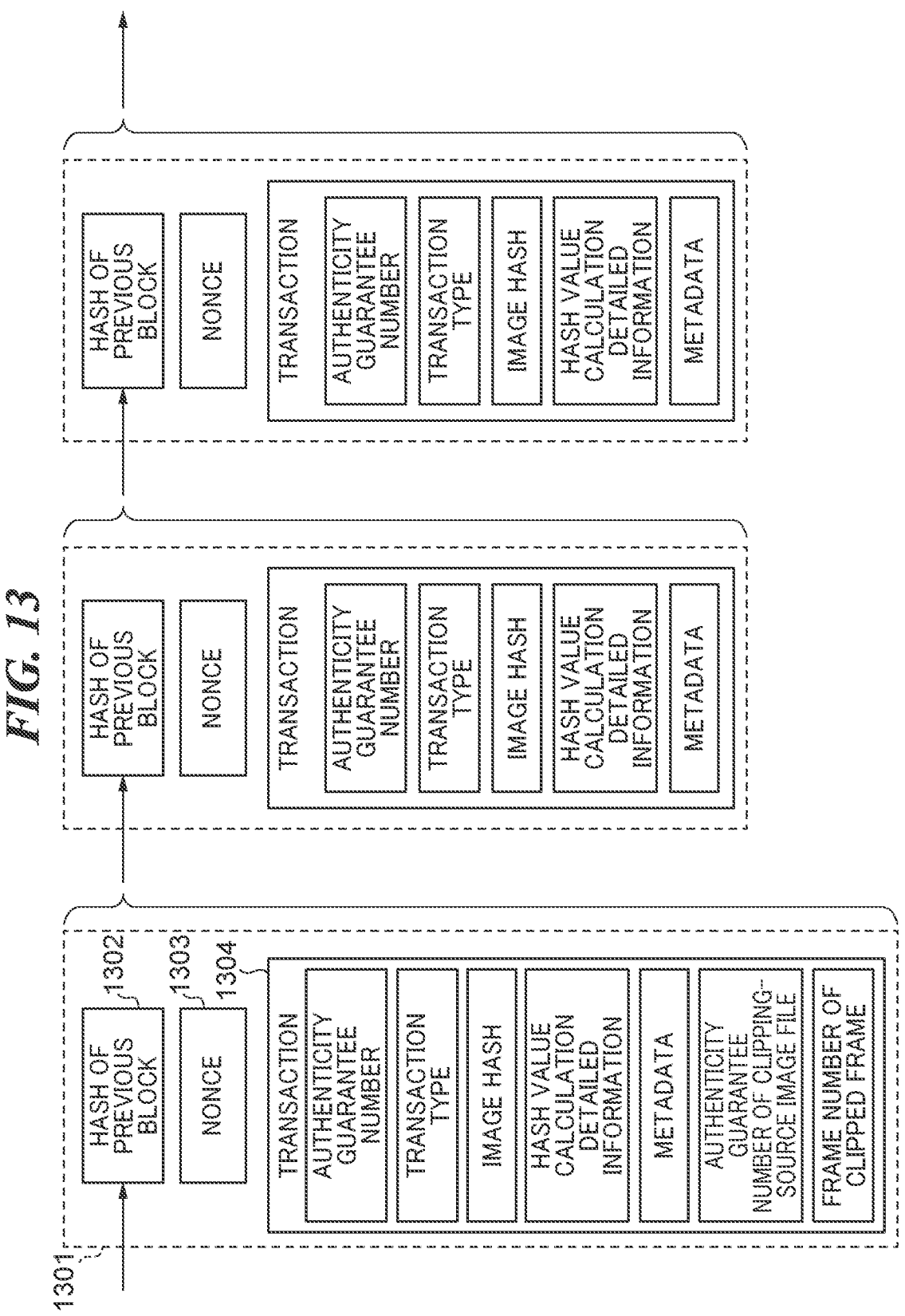
FIG. 13 is a view showing an example of a block data structure of the blockchain managed by the blockchain manager in FIG. 4.

The transaction generator 404 then broadcasts the transaction data to one or more computers (nodes) participating in the peer-to-peer blockchain network 104. When the broadcasted transaction data is approved by the miner and the verification thereof is completed, the block generator 405 generates a block 1301 in FIG. 13 in which the verified transaction data is written. In addition, the block generator 405 connects (registers) the block 1301 to the blockchain.

The block 1301 is similar in configuration to the block 701 described above and includes a hash 1302 of a previous block, a nonce 1303, and a transaction 1304. The hash 1302 of the previous block has the same configuration as the hash 702 of the previous block described above. The nonce 1303 has a configuration similar to that of the nonce 703 described above.

The transaction 1304 is transaction data generated by the transaction generator 404 and includes a transaction type, an image hash, an authenticity guarantee number, and metadata. The transaction 1304 further includes the authenticity guarantee number of the clipping source image file obtained in the step S1203 and the frame number obtained in the step S1206 (the frame number of the clipped frame).

In this embodiment, when the hash value is generated while skipping a part of the binary data of the image file in generating the hash value in the step S1207, the above-described hash value calculation detailed information is generated. In this case, the transaction 1304 also includes the hash value calculation detailed information.

Next, the controller 400 issues a block ID corresponding to the block (step S1210) as with the step S1009 described above. Next, the controller 400 registers the issued block ID, the edited image file read in the step S1206, and the authenticity guarantee number generated in the step S1208 in the image database 407 in association with each other (step S1211). Thereafter, the image file edition process is terminated.

In the above-described embodiment, the edited image file includes the clipped still image data generated by clipping a part of frames from the moving image data included in the image file of which the hash value and the authenticity guarantee number (an identification number) are registered in the blockchain in association with each other. This enables determination of the authenticity of the image file including the still image data clipped from the moving image data included in the image file of which the hash value and the authenticity guarantee number are registered in the blockchain in association with each other.

In the above-described embodiment, the management system 101 includes the still image clipping device 411 that generates the clipped still image data. This enables easy generation of the image file including the still image data clipped from the moving image data included in the image file of which the hash value and the authenticity guarantee number are registered in the blockchain in association with each other.

In the above-described embodiment, when the edited image file includes the clipped still image data, the authenticity guarantee number of the clipping source image file of the clipped still image data and the frame number corresponding to the clipped still image data are registered in the blockchain in association with the hash value and authenticity guarantee number of the edited image file. This enables management of the information about the clipping source as the information relating to the edited image file.

When an authenticity confirmation request for an edited image file registered in the blockchain by the above-described image file edition process in FIG. 12 is received, the following process is performed. Specifically, when the accessed block includes the authenticity guarantee number of the clipping source image file in the authenticity determination process in FIG. 9 described above, the controller 400 obtains the authenticity guarantee number of the clipping source image file together with the hash value from the blockchain in the step S903.

In addition, the controller 400 notifies the requester who has made the authenticity confirmation request of the authenticity guarantee number of the clipping source image file together with the determination result in the step S910. Accordingly, since the viewer who has made the authenticity confirmation request can easily know the determination result of the authenticity of the image file and the clipping source image file from which the still image data included in the image file is clipped, the viewer can confirm that the still image data is not generated by malicious tampering.

In this embodiment, the edited image file is not limited to an image file including image data edited by the management system 101 and may be an image file including image data edited by the image capturing apparatus 102. An image file including panoramic image data is an example of the image file including the image data edited by the image capturing apparatus 102.

Figure 14A:
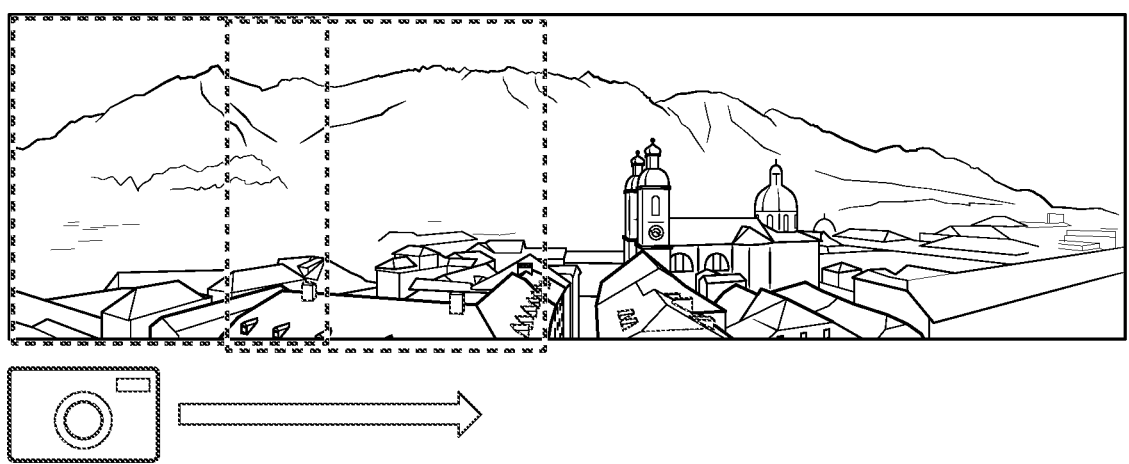
FIGS. 14A and 14B are views describing image capturing using a panorama synthesis function of the image capturing apparatus in FIG. 1.

The panoramic image data is synthetic image data generated by the image capturing apparatus 102 capturing using the panorama synthesis function and is obtained by synthesizing a plurality of pieces of image data having different field angles. The panorama synthesis function is a function of generating one piece of wide-angle panorama image data by synthesizing a plurality of pieces of image data obtained by continuous capturing by the image capturing apparatus 102 in a panning direction while an image capturing person performs a panning operation as shown in FIG. 14A.

Figure 15:
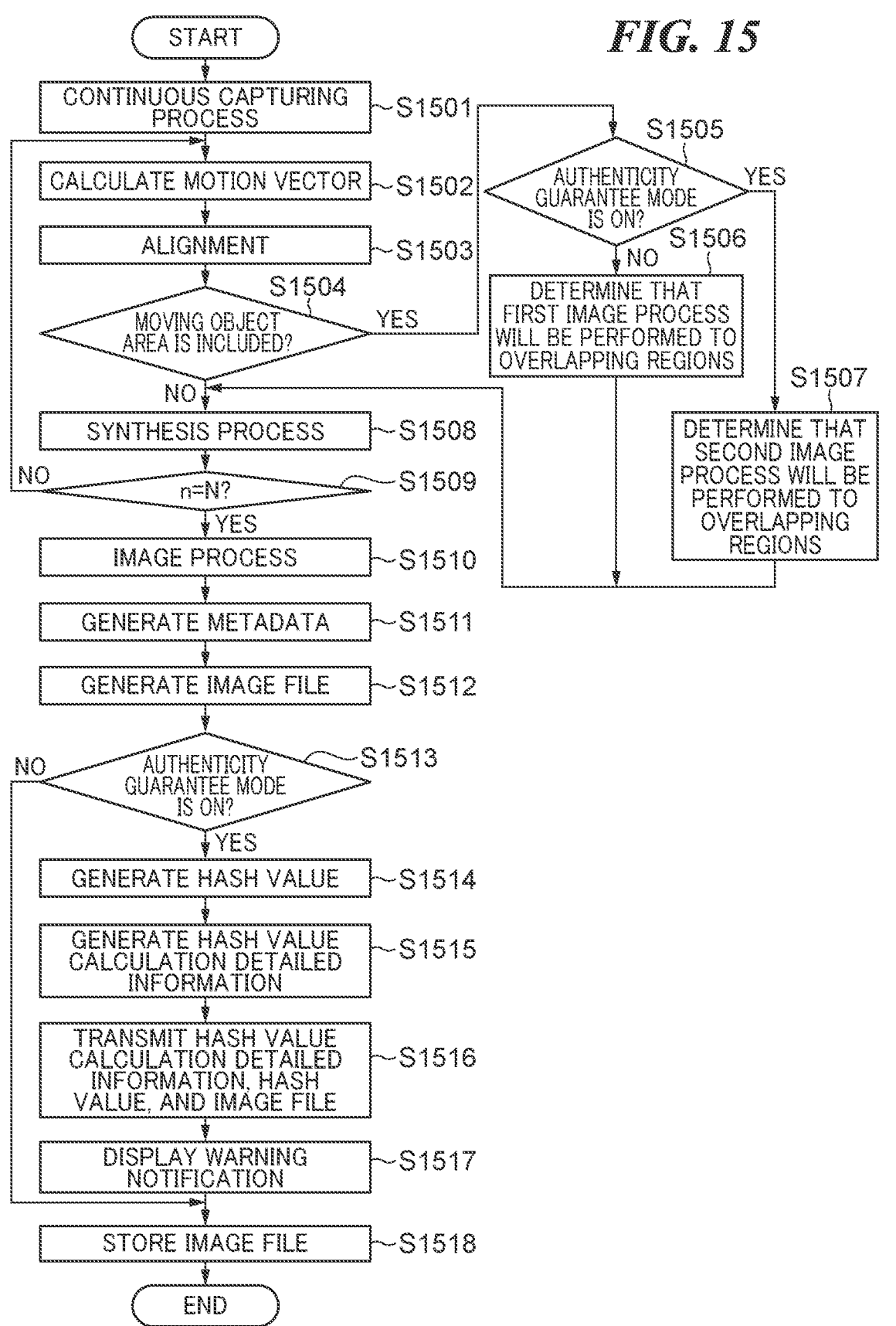
FIG. 15 is a flowchart showing another procedure of the image data transmission process performed by the image capturing apparatus in FIG. 1.

FIG. 15 is a flowchart showing another procedure of the data transmission process performed in the image capturing apparatus 102 in FIG. 1. The data transmission process in FIG. 15 is similar to the data transmission process in FIG. 3 described above, and in the following description, contents different from the data transmission process in FIG. 3 described above will be particularly described.

The data transmission process in FIG. 15 is also achieved by the MPU 201 of the image capturing apparatus 102 executing a program stored in the storage medium 209 as with the data transmission process in FIG. 3 described above. The data transmission process shown in FIG. 15 is started when the image capturing apparatus 102 receives an image capturing start operation, such as a pressing of the image capturing button of the image capturing apparatus 102, by an image capturing person in a state where the panorama synthesis function is activated. After performing such an image capturing start operation, the image capturing person performs a panning operation of the image capturing apparatus 102.

In FIG. 15, first, the MPU 201 performs a continuous capturing process in step S1501. This generates a plurality of pieces of image data having different field angles. Next, the MPU 201 performs an image synthesis process to generate panoramic image data. Specifically, the MPU 201 performs a process in steps S1502 to S1509 for the number of pieces of the image data generated in the step S1501.

In the image synthesis process, first, the MPU 201 sets a variable n indicating the ordinal number of the image data to 1, and calculates a motion vector between the first image data and the second image data in step S1502. For example, a motion vector is calculated by a method for extracting a region including a feature point from n-th image data, searching (n+1)th image data for a region similar to the extracted region, and calculating a relative motion vector between the two pieces of image data.

A method of calculating a motion vector between the n-th image data and the (n+1)th image data based on an output of an acceleration sensor (not shown) or a speed sensor (not shown) included in the image capturing apparatus 102 may be employed.

Figure 14B:
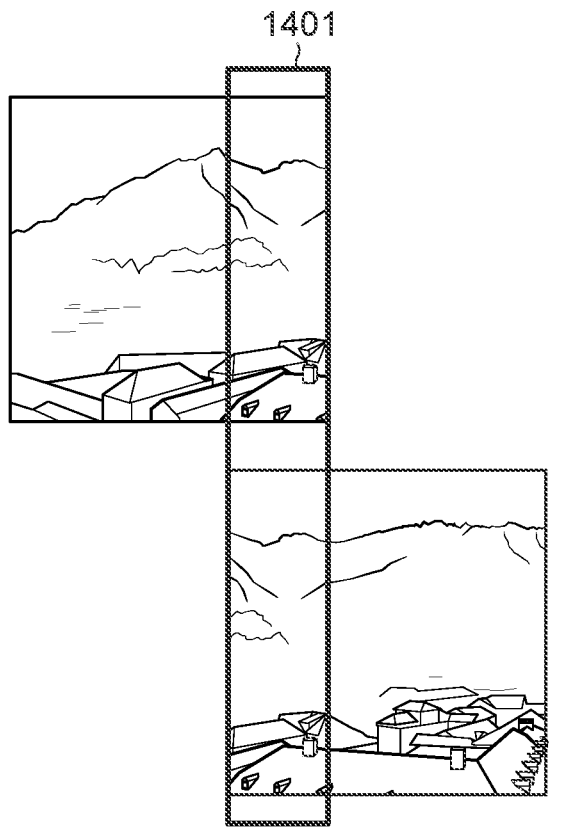

Next, the MPU 201 aligns the first image data and the second image data in step S1503. In this embodiment, when the n-th image data and the (n+1)th image data are synthesized, edges of the two pieces of image data are not connected to each other. For example, as shown in FIG. 14B, overlapping regions (margins) 1401 having predetermined widths are overlapped and synthesized. In this embodiment, in order to synthesize the image data in such overlap regions without giving strangeness, the alignment in the step S1503 is performed based on the motion vector calculated in the step S1502, and a process in step S1504 is performed.

In the step S1504, the MPU 201 determines whether a region of a moving object (a moving object region) is included in an overlapping region. The moving object is an object that has moved during the continuous capturing process. In the step S1504, for example, the sum/of absolute differences between pixel values in the overlapping region of the n-th image data and pixel values in the overlap region of the (n+1)th image data. It is determined whether the moving object region is included in the overlapping regions based on the calculated value. For example, when the calculated value is smaller than a threshold, it is determined that the moving object region is not included in the overlapping regions. In this case, the data transmission process proceeds to step S1508 described later. In the meantime, when the calculated value is equal to or larger than the threshold, it is determined that the moving object region is included in the overlapping regions. In this case, the data transmission process proceeds to step S1505.

In the step S1505, the MPU 201 determines whether an authenticity guarantee mode is set to ON. In this embodiment, the user can set ON/OFF of the authenticity guarantee mode before performing the image capturing start operation. When the authenticity guarantee mode is set to ON, a process for registering information about the image file including the generated panoramic image data in the block-chain is performed. In the meantime, when the authenticity guarantee mode is set to OFF, the process for registering the information of the image file including the generated panoramic image data in the blockchain is not performed.

When it is determined in the step S1505 that the authenticity guarantee mode is set to OFF not to ON, the MPU 201 determines that a first image process will be performed for the overlapping regions. The first image process removes the moving object region of which a size is less than a predetermined value by replacing the moving object region with data interpolated from texture of peripheral pixels. When the first image process is performed, it is possible to prevent generation of a strange image in which the moving object regions included in the overlapping regions become a double image. Next, the data transmission process proceeds to the step S1508 described later.

In the meantime, when it is determined in the step S1505 that the authenticity guarantee mode is set to ON, the MPU 201 determines that a second image process, which is different from the first image process, will be performed for the overlapping regions. When the above-described first image process is performed, although it is possible to prevent generation of a strange image in which the moving object regions included in the overlapping regions become a double image, the moving object regions originally captured disappear from the image data.

That is, there is a concern that a component included in the image data may change and the meaning of the image data may change. Therefore, even if the first image process performed to the overlapping regions is not arbitrary tampering, it is not preferable from a viewpoint of guaranteeing authenticity. Against this, in this embodiment, when it is determined that the authenticity guarantee mode is set to ON, the second image process is performed to the overlapping regions. The second image process synthesizes the pixel values in the overlapping region of the n-th image data and the pixel values in the overlapping region of the (n+1)th image data at 50:50 and does not remove the moving object regions. This can prevent the moving object regions originally captured from disappearing from the image data due to the image process performed to the overlapping regions.

Next, in the step S1508, the MPU 201 performs a synthesis process of synthesizing the first image data and the second image data. In the synthesis process, as described above, the MPU 201 overlaps and synthesizes the overlapping regions of the first image data and the second image data. The image process determined in the step S1506 or S1507 is applied to the overlapping regions. When it is determined in the step S1504 that the moving object regions are not included in the overlapping regions, the second image process is performed to the overlapping regions.

Then, the MPU 201 determines in step S1509 whether the variable n has reached N indicating the last image data. When it is determined that the variable n does not reach N, the MPU 201 increments the variable n and the data transmission process returns to the step S1502. In this way, in this embodiment, the process from the steps S1502 to S1508 described above is performed to all pieces of the image data generated in the step S1501, and the panoramic image data is generated by synthesizing these pieces of the image data.

When it is determined in the step S1509 that the variable n reaches N, the MPU 201 performs the image process, such as an encoding process, (step S1510) in the same manner as in the step S303 described above. In the next step S1511, the MPU 201 generates metadata including attribute information (an image capturing person, an image capturing time, an image capturing location, a model of the image capturing apparatus, a setting value at the time of image capturing, etc.) in performing the image capturing process to generate the panoramic image data.

Next, the MPU 201 generates an image file in which the metadata is added to the panoramic image data (step S1512). Next, the MPU 201 determines whether the authenticity guarantee mode is set to ON (step S1513).

When it is determined in the step S1513 that the authenticity guarantee mode is set to ON, a process in steps S1514 to S1517 is performed to register the information about the image file generated in the step S1512 in the blockchain.

In the step S1514, the MPU 201 controls the hash value generator 210 to perform the hash function to the binary data of the image file generated in the step S1512 to generate a hash value.

In generating (calculating) a hash value, the hash value may be generated while skipping a part of the binary data of the image file. In this case, the MPU 201 generates the hash value calculation detailed information that records how the binary code of the image file is skipped (a thinning method) (step S1515).

Next, the MPU 201 controls the communication circuit 211 to transmit the hash value and the image file to the management system 101 (step S1516). At this time, when the hash value calculation detailed information is generated in the step S1515, this information is also transmitted to the management system 101. The data transmitted in the step S1516 may be encrypted. In addition, the MPU 201 causes the image display 207 to display a warning notification similarly to the above-described step S309 (step S1517).

Next, the MPU 201 stores the image file into the storage medium 209 (step S1518) and ends the process.

When it is determined in the step S1513 that the authenticity guarantee mode is set to OFF, the process in the steps S1514 to S1517 to register the information about the image file generated in the step S1512 in the blockchain is not performed, and the data transmission process proceeds to the step S1518 described later.

In the process in FIG. 15 described above, the image file including the panoramic image data and the hash value thereof is transmitted to the management system 101. This enables determination of the authenticity of the image file including the panoramic image data edited since its capturing.

In addition, in the process in FIG. 15 described above, when the authenticity guarantee mode is set to ON (valid), the second image process in which the moving object regions are not removed is executed in the image synthesis process. This can prevent the moving object regions originally captured from disappearing from the image data due to the image process performed to the overlapping regions.

In this embodiment, the N pieces of pre-synthesis image data used for generating the panoramic image data and their hash values may be transmitted to the management system 101 together with the image file and its hash value in the step S1516 described above.

When receiving these pieces of data, the management system 101 generates a block in which transaction data including the authenticity guarantee number, the hash value of the image file, the hash values of the N pieces of pre-synthesis image data, the hash value calculation detailed information, and the metadata is written, and connects (registers) the block to the blockchain.

In addition, the management system 101 registers the image file and the N pieces of pre-synthesis image data in the image database 407 in association with the block ID and the authenticity guarantee number corresponding to the block. As described above, since the information about the pre-synthesis image data is registered in the blockchain, it can be guaranteed that the panoramic image data is the synthetic image data generated from the N pieces of pre-synthesis image data, and the authenticity of the image file including the panoramic image data can be guaranteed.

In this embodiment, the image synthesis process is not limited to the process of generating panoramic image data. For example, the image synthesis process may be a process of synthesizing a plurality of pieces of image data generated in a continuous capturing process to generate one piece of synthetic image data in which influence of camera shake is reduced. In this case, authenticity of an image file including the synthetic image data in which the influence of the camera shake is corrected based on the plurality of pieces of image data generated in the continuous capturing process can be determined.

In addition, in this embodiment, the image synthesis process may be an HDR synthesis process in which a plurality of pieces of image data that are generated in the continuous capturing process and are different in brightness are synthesized to generate one piece of synthetic image data having a wide brightness reproducibility. In this case, authenticity of an image file including the synthetic image data having the wide brightness reproducibility generated based on the plurality of pieces of image data generated in the continuous capturing process can be determined.

Further, in this embodiment, the image synthesis process may be a process of synthesizing a plurality of pieces of image data generated in the continuous capturing process to generate one piece of synthetic image data in which noise is reduced. In this case, authenticity of an image file including the synthetic image data in which the noise is reduced based on the plurality of pieces of image data generated in the continuous capturing process can be determined.

In addition, in this embodiment, the image synthesis process may be controlled so as not to perform an image process using a learning model learned by machine learning. A process content of the image process using the learning model learned by the machine learning becomes a black box, and the image data may be changed unintentionally so as to change the meaning of the image data. It is not preferable to register information about an image file including image data obtained by such an image process in a blockchain for guaranteeing authenticity of a content. Against this, the above-mentioned control can prevent registration of an image file including image data obtained by an image process by which an image data may be changed unintentionally in the blockchain.

In addition, in this embodiment, when the authenticity guarantee mode is set to ON, the MPU 201 may control so as not to use the panorama synthesis function.

In addition, in this embodiment, when the authenticity guarantee mode is set to ON, the MPU 201 may control so as not to generate a hash value of an image file including generated panoramic image data.

Further, in this embodiment, when the authenticity guarantee mode is set to ON, the MPU 201 may control so as not to transmit an image file including generated panoramic image data and its hash value to the management system 101. This can prevent registration of an image file including image data of which meaning has changed, such as image data from which a moving object region originally captured disappear, to the blockchain.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefits of Japanese Patent Applications No. 2022-128180, filed Aug. 10, 2022, No. 2022-187312, filed Nov. 24, 2022, and No. 2023-109521, filed Jul. 3, 2023, which are hereby incorporated by reference herein in their entireties.

What is claimed is:

1. An image data management system comprising:

a memory device that stores a set of instructions; and at least one processor configured to execute the set of instructions to:

apply an edition process to image data generated by an image capturing apparatus capturing an image of an object, a content in accordance with an instruction from an administrator of the image data, wherein the edition process includes a RAW development process for converting undeveloped image data into image data in a predetermined data format;

immediately after generating edited image data by the edition process, generate a hash value of the edited image data;

generate an identification number for identifying the edited image data;

register the hash value of the edited content image data, the identification number, an identification number for identifying the image data to which the edition process is not applied, and edition information indicating edition applied to the image data by the edition process in a blockchain in association with each other;

receive image data subjected to an authenticity determination and an identification number for identifying the image data concerned; and determine the authenticity of the received image data by comparing a hash value generated from the received image data with the hash value registered in the blockchain and corresponding to the received identification number, wherein the edition process is executed by the at least one processor using image data stored in a storage device of the image data management system, and the edited image data is not transmitted to an external device before registering the hash value and the identification number in the blockchain.

2. The image data management system of claim 1, wherein the image data is undeveloped image data.

3. The image data management system according to claim 1, wherein the edition process is-includes a predetermined image process executed to image data.

4. The image data management system according to claim 1, wherein the image data is one of still image data and moving image data.

5. The image data management system according to claim 4, wherein the edited image data includes clipped still image data generated by clipping a partial frame from moving image data included in the image data that is registered in the blockchain in association with the hash value and the identification number.

6. The image data management system according to claim 5, wherein the at least one processor executes instructions in the memory device to generate the clipped still image data.

7. The image data management system according to claim 5, wherein the at least one processor executes instructions in the memory device to register an identification number of a clipping source image data of the clipped still image data and a frame number of a frame clipped from the clipping source image data to the blockchain in association with the hash value and the identification number of the edited image data in a case where the edited image data includes the clipped still image data.

8. The image data management system according to claim 7, wherein the at least one processor executes instructions in the memory device to:

obtain the identification number of the clipping source image data of the clipped still image data in determining the authenticity of the received image data in a case where the identification number of the clipping source image data of the clipped still image data is registered in the blockchain in association with the received identification number; and notify a requester, who requests determination of the authenticity of the received image data, of the identification number of the clipping source image data of the clipped still image data together with a result of the determination.

9. The image data management system according to claim 1, wherein the at least one processor executes instructions in the memory device to:

obtain edition information indicating edition applied to the received image data by the edition process from the blockchain in determining the authenticity of the received image data in a case where the edition information is registered in the blockchain in association with the received identification number, and notify a requester, who requests determination of the authenticity of the received image data, of the obtained edition information together with a result of the determination.

10. The image data management system according to claim 1, wherein the at least one processor executes instructions in the memory device not to register the hash value of the edited image data to the blockchain in a case where the identification number for identifying the image data to which the edition process is not applied.

11. A image data management method comprising:

applying an edition process to image data generated by an image capturing apparatus capturing an image of an object, in accordance with an instruction from an administrator of the image data, wherein the edition process includes a RAW development process for converting undeveloped image data into image data in a predetermined data format;

immediately after generating edited image data by the edition process, generating a hash value of the edited image data;

generating an identification number for identifying the edited image data;

registering the hash value of the edited image data and the identification number, an identification number for identifying the image data to which the edition process is not applied, and edition information indicating edition applied to the image data by the edition process in a blockchain in association with each other;

receiving image data subjected to an authenticity determination and an identification number for identifying the image data concerned;

determining the authenticity of the received image data by comparing a hash value generated from the received image data with the hash value registered in the blockchain and corresponding to the received identification number, wherein the edition process is executed using image data stored in a storage device, and the edited image data is not transmitted to an external device before registering the hash value and the identification number in the blockchain.

12. A non-transitory computer-readable storage medium storing a control program causing a computer to execute image data management method, the image data management method comprising:

applying an edition process to image data generated by an image capturing apparatus capturing an image of an object, in accordance with an instruction from an administrator of the image data, wherein the edition process includes a RAW development process for converting undeveloped image data into image data in a predetermined data format;

immediately after generating edited image data by the edition process, generating a hash value of the edited image data;

generating an identification number for identifying the edited image data;

registering the hash value of the edited image data, and the identification number, an identification number for identifying the image data to which the edition process is not applied, and edition information indicating edition applied to the image data by the edition process in a blockchain in association with each other;

receiving image data subjected to an authenticity determination and an identification number for identifying the image data concerned; and determining the authenticity of the received image data by comparing a hash value generated from the received image data with the hash value registered in the blockchain and corresponding to the received identification number, wherein the edition process is executed using image data stored in a storage device, and the edited image data is not transmitted to an external device before registering the hash value and the identification number in the blockchain.

\*   \*   \*   \*   \*